(12) United States Patent
Eldering et al.

(10) Patent No.: US 8,280,633 B1
(45) Date of Patent: Oct. 2, 2012

(54) WEATHER RISK ESTIMATION SYSTEM AND METHOD

(75) Inventors: Charles A. Eldering, Furlong, PA (US); Edward A. Ehrlacher, Philadelphia, PA (US)

(73) Assignee: Strategic Design Federation W, Inc. (VG)

( * ) Notice: Subject to any disclaimer, the term of this patent is extended or adjusted under 35 U.S.C. 154(b) by 588 days.

(21) Appl. No.: 12/368,698

(22) Filed: Feb. 10, 2009

(51) Int. Cl.
G01W 1/00 (2006.01)
G06G 7/56 (2006.01)
G06Q 10/00 (2012.01)

(52) U.S. Cl. .................. 702/3; 703/5; 705/7.28

(58) Field of Classification Search ............ 702/3, 1–2, 702/4, 14–16, 179, 181–183, 188; 703/1–2, 703/5; 73/170.16–170.17; 345/418–419, 345/581, 619; 705/1.1, 4, 7.11, 7.28, 7.34–7.38, 705/7.41, 400; 707/602–603, 705, 736, 758, 707/772, 781; 715/200, 255, 267, 273, 700, 715/705, 730, 732, 734, 748, 771, 833
See application file for complete search history.

(56) References Cited

U.S. PATENT DOCUMENTS

| | | | |
|---|---|---|---|
| 4,766,539 A | 8/1988 | Fox | |
| 5,831,876 A * | 11/1998 | Orr et al. | 703/6 |
| 5,839,113 A | 11/1998 | Federau et al. | |
| 7,181,346 B1 | 2/2007 | Kleist et al. | |
| 7,184,983 B2 | 2/2007 | Corby et al. | |
| 7,219,015 B2 | 5/2007 | Bresch et al. | |
| 7,280,920 B1 | 10/2007 | Whiteside et al. | |
| 7,353,115 B2 | 4/2008 | Bertogg et al. | |
| 2003/0130904 A1 | 7/2003 | Katz et al. | |
| 2004/0186753 A1 | 9/2004 | Kim et al. | |
| 2004/0236676 A1 | 11/2004 | Takezawa et al. | |
| 2004/0260703 A1 | 12/2004 | Elkins | |
| 2005/0114829 A1 | 5/2005 | Robin et al. | |
| 2005/0216386 A1 | 9/2005 | Klugman | |
| 2005/0251428 A1 | 11/2005 | Dust et al. | |
| 2006/0155628 A1 | 7/2006 | Horowitz | |
| 2006/0218019 A1 | 9/2006 | Reis | |
| 2006/0218021 A1 | 9/2006 | Sato | |
| 2007/0143019 A1 | 6/2007 | Feyen et al. | |
| 2007/0168155 A1 | 7/2007 | Ravela et al. | |
| 2007/0203759 A1 | 8/2007 | Mathai et al. | |
| 2007/0214023 A1 | 9/2007 | Mathai et al. | |
| 2007/0223841 A1 | 9/2007 | Weinzapfel et al. | |
| 2007/0225915 A1 | 9/2007 | Weinzapfel et al. | |

(Continued)

OTHER PUBLICATIONS

Stewart et al., Hurricane Risks and Economic Viability of Strengthened Construction, Feb. 2003, Natural Hazards Review, pp. 12-19.*

(Continued)

*Primary Examiner* — Toan M Le
(74) *Attorney, Agent, or Firm* — Carlineo, Spicer & Kee, LLC

(57) ABSTRACT

A method of presenting a visual representation of a probable impact of a weather phenomenon to a location includes obtaining an impact function for the location by combining a weather function corresponding to a characteristic of the weather phenomenon with a damage function associated with the same characteristic. A graphic representation of an interest at the location is obtained. A visual representation of a probable impact of the weather phenomenon on the interest by modifying the graphic representation of the interest, where the modification is based on a predicted impact to the interest determined using the impact function.

27 Claims, 20 Drawing Sheets

U.S. PATENT DOCUMENTS

2008/0021659 A1  1/2008  Bertogg et al.
2008/0133429 A1  6/2008  Horowitz
2008/0133430 A1  6/2008  Horowitz
2008/0294469 A1  11/2008 Caballero et al.
2009/0024543 A1  1/2009  Horowitz et al.
2009/0177500 A1  7/2009  Swahn

OTHER PUBLICATIONS

Rodriguez, F., Hurricane Damage Mitigation: Field Deployment Strategies and Residential-Vulnerability Modeling, 2007, A Master Degree Thesis, University of Florida, 98 pp.*

* cited by examiner

WEATHER RISK ESTIMATION SYSTEM AND METHOD

CROSS REFERENCE TO RELATED APPLICATIONS

This application is related to co-pending U.S. patent application Ser. No. 12/368,648, filed Feb. 10, 2009, entitled Weather Risk Estimation System and Method, U.S. patent application Ser. No. 12/368,655, filed Feb. 10, 2009, entitled Weather Risk Estimation System and Method, U.S. patent application Ser. No. 12/368,703, filed Feb. 10, 2009, entitled Weather Risk Estimation System and Method, U.S. patent application Ser. No. 12/368,714, filed Feb. 10, 2009, entitled Weather Risk Estimation System and Method, and U.S. patent application Ser. No. 12/368,732, filed Feb. 10, 2009, entitled Weather Risk Estimation System and Method, the entire disclosures of which are incorporated herein by reference.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

Figure 1:
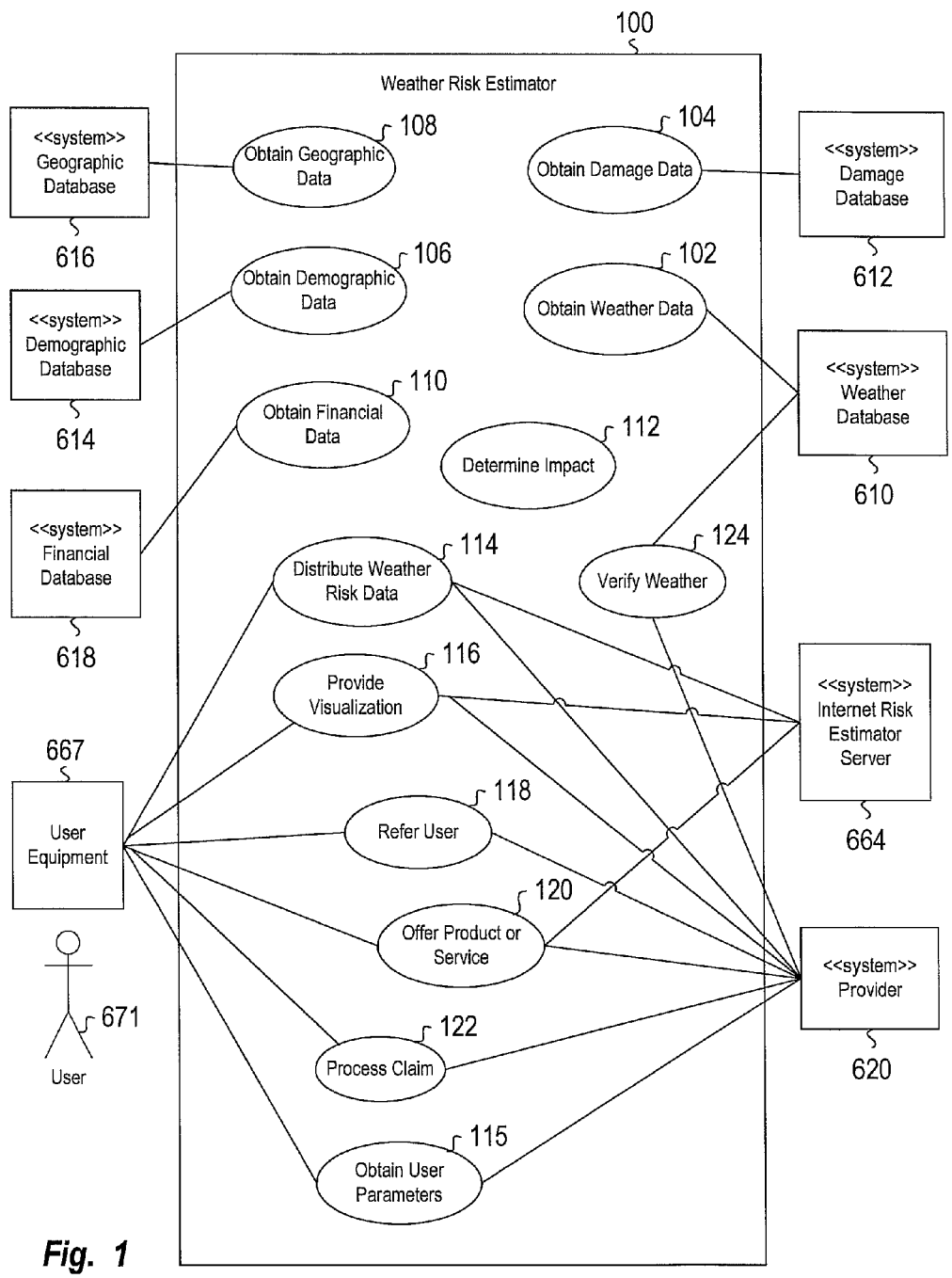
FIG. 1 is a use case diagram for the weather risk estimator in accordance with an embodiment of the weather risk estimation system.

Certain terminology is used herein for convenience only and is not to be taken as a limitation on the present disclosure. In the drawings, the same reference letters are employed for designating the same elements throughout the several figures. The words "right", "left", "lower" and "upper" designate directions in the drawings to which reference is made. The words "inwardly" and "outwardly" refer to directions toward and away from, respectively, the geometric center of the weather risk estimation system and designated parts thereof. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present disclosure, but do not constrain implementation thereof to any particular hardware or software embodiments.

Hereafter, relative to the discussion of the weather risk estimation system and method described herein, weather phenomena include any type of storm, including tropical cyclones, convective storms, such as thunderstorms and thunderstorm systems, tornados, winter storms, fronts, and any other type of storm, storm system, weather event, weather system or weather pattern recognized by one skilled in that art. Tropical cyclone refers to tropical storms, hurricanes, typhoons, and any other rotating storm systems of tropical nature understood by one of ordinary skill in the art. Environmental phenomenon include, but are not limited to, earthquakes, tsunamis, wildfires, avalanches, floods, mudslides, and climate changes attributed to both human influence and natural fluctuations, such as rise the average global temperature, rise in the average sea-level, accelerated melting of the polar ice and glaciers, and deforestation. Weather phenomena and environmental phenomena are hereafter collectively referred to as earth events in the context of the weather risk estimation system. The systems and methods described below, while generally discussed and exemplified herein using weather phenomena, and specifically hurricanes, should not be considered as limited to embodiments for tropical cyclones, but may be applied to any weather or environmental phenomenon. In addition, the exemplary use of the hurricane hereafter should not be considered as limiting to cyclonic storms originating in the Northern Atlantic basin, but are applicable to tropical cyclones originating in any of the waters of the world.

Weather phenomena and environmental phenomena are not only capable of inflicting damage to both people and property, but may also cause disruptions to activities, commerce, transportation, etc. Any person, property, activity, event, etc. subject to such disruptions and damages are collectively referred to hereafter as interests. Examples of interests include, but are not limited to, friends or relatives in a location different than a user of the weather risk estimator, a single household, collection of households, buildings, farmland, beach property, roadways, bridges, sporting events, concerts, outdoor festivals, airline flights, cruises, family vacations, and parcel deliveries.

In an embodiment, the weather risk estimation system and method utilizes probabilistic representations of earth events in combination with probabilistic damage estimates to determine an impact to interests for a location. For example, the insurance and reinsurance industry can combine the weather forecast data for a hurricane with landfall damage models to assess potential insured losses by taking into account the intensity of the hurricane at landfall and the insured value of property in the expected landfall region. Insurers and reinsurers can adjust pricing for insurance and re-insurance products in near-real time as updated hurricane information is obtained and used by the weather risk estimator to provide updated impacts. In an embodiment, the impacts predicted by the weather risk estimator are used by financial instrument traders and brokers to obtain favorable positions in the trading of weather related financial instruments, such as weather derivatives or catastrophe bonds. A location is not limited to a specific type or size of geographic boundary, and may be selected or changed based on the earth event, or a preference of a user of the weather risk estimator. For example, a location may be a small as a single household, or it may also encompass a city, zip code, or state, a set of coastal communities, or a grouping of zip codes.

Figure 15:
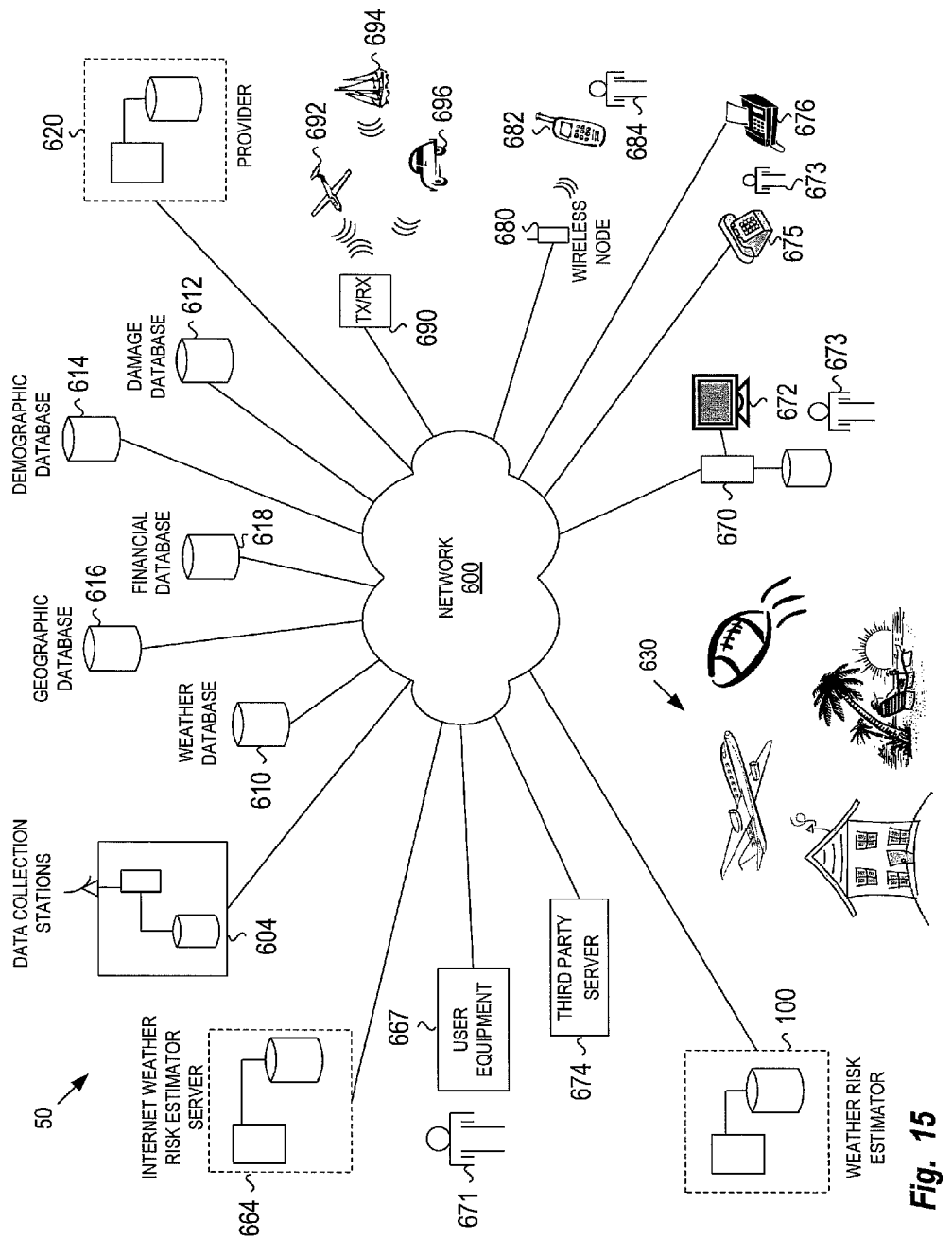
FIG. 15 is a network diagram of the weather risk estimation system of FIG. 1.

FIG. 1 is a use-case diagram for a weather risk estimator (WRE) 100 included in the weather risk estimation system 50 (see FIG. 15) and associated systems and actors in accordance with one embodiment of the present disclosure. Referring generally to FIGS. 1 and 15, weather data used by in the risk estimation by the WRE 100 is obtained using an obtain weather data use case 102. The weather data is obtained from one or more weather databases 610. The weather data obtained from the weather databases 610 may include historical, current, or predicted weather data, or may be a weather function, all described in more detail below. The weather database may also include meteorological and/or climate models that can be utilized by the WRE 100. In an embodiment, the weather function is calculated by the WRE 100 using the historical, current, or predicted weather data obtained from the weather database 610. The WRE 100 may also obtain damage data from one or more damage databases 612 using an obtain damage data use case 104. The damage data obtained from the damage databases 610 may include historical, current, or predicted damage data, or may be a damage function, all described in more detail below. The damage database may also include damage models that can be utilized by the WRE 100. The WRE 100 may utilize information stored in other types of databases as well in order to determine weather risk data. Geographic data may be obtained from a geographic database 616 using an obtain geographic data use case 106. Demographic data may be obtained from a demographic database 614 using an obtain demographic data use case 106. Financial data may be obtained from a financial database 618 using an obtain financial data use case 110. It should be noted that multiple databases containing each type of data (e.g., weather data or damage data) may be utilized by the WRE 100, and the single instance of each type of database (e.g., weather database 610 or damage database 612) as shown in FIG. 1 should not be considered limiting.

The WRE 100 obtains user data through the obtain user parameters use case 115. On user equipment 667, the user 671 may be prompted to input data to the WRE 100 using text boxes, drop down menus, check boxes or any other data entry technique understood in the art. Examples of user equipment 667 are described below.

The impact of an earth event on interests 630 (see FIG. 15) of a user 671 of the WRE 100 are determined using a determine impact use case 112. In the determine impact use case 112, the data obtained by the WRE 100 from the various databases is analyzed to determine the potential impact and assess the risk of the earth event on the interests 630 of the user 671. The WRE 100 may perform a risk assessment for an earth event based on an analysis of historical and predictive data related to an occurrence or expected of the earth event. In an embodiment, the weather functions and damage functions are used by the WRE 100 to determine the impact function, described in more detail below. The user parameters and the impact functions may be utilized to create a visualization of the impact of the earth event to interests 630 of the user 671, such as their location, property, or travel plans using a provide visualization use case 116, The visualization may include a user input option where a user viewing the visualization can change the values of the parameters used in creating the visualization. Using an offer product or service use case 120, the WRE 100 may provide a user with an opportunity to purchase products or services, including supplemental offerings, described below, based on the impact to the user 671 or an interest 630 of the user 671 by an earth event. Examples of products and services offered through the WRE 100 include, but are not limited to insurance policies, such as homeowner or other personal property insurance, travel delay or trip cancellation insurance, event cancellation insurance, building materials or services, and financial instrument trading. The actual transaction of the product or service between the provider 620 and the user 671 may be completed through the WRE 100, or the WRE 100 may refer the user 671 to a provider 620 using a refer user use case 118. Providers 620 include insurance companies, reinsurance companies, financial instrument traders, travel companies, airlines, or any other transactor of a product or service. Once the user 671 has been referred to the provider 620 by the WRE 100, the transaction may be completed by an interaction between the user 671 (via the user equipment 667) and the provider 620 using electronic commerce techniques well understood in the art.

Information and data from the WRE 100, collectively referred to as weather risk estimation data may also be shared with a provider 620, user equipment 667, or subscriber system 670 (not shown) external to the WRE 100 using a distribute weather risk data use case 114. Examples of weather risk estimation data include the weather, damage and/or impact functions, user parameters, and the visualization. In one embodiment, the impact functions are made available to the provider 620, user equipment 667, or subscriber systems 670 (shown below in FIG. 15) using the distribute weather risk data use case 114. Display mechanisms and human-machine interfaces for distribution of the weather risk estimation data from WRE 100 output data are generally known in the art, and omission of further details should not be considered limiting. Furthermore, the weather risk estimation data may be shared using the distribute weather risk data use case 114 with a third party computer system or network designed to interact with the WRE 100, such as an internet weather risk estimator server 664.

The WRE 100 also may process claims related to insurance policies issued through the WRE 100 using a process claims use case 122. The WRE 100 may obtain verification data for processing insurance claims in order to verify the impact on an earth event on the insured interest 630 using a verify weather use case 124. The verification data may be used by the WRE 100 to verify claims for insurance policy issued to a user 671 through the WRE 100, or the provider 620 may receive the verification data from the WRE 100 in order to verify claims for policies transacted directly between the user 671 and provider 620.

Figure 2:
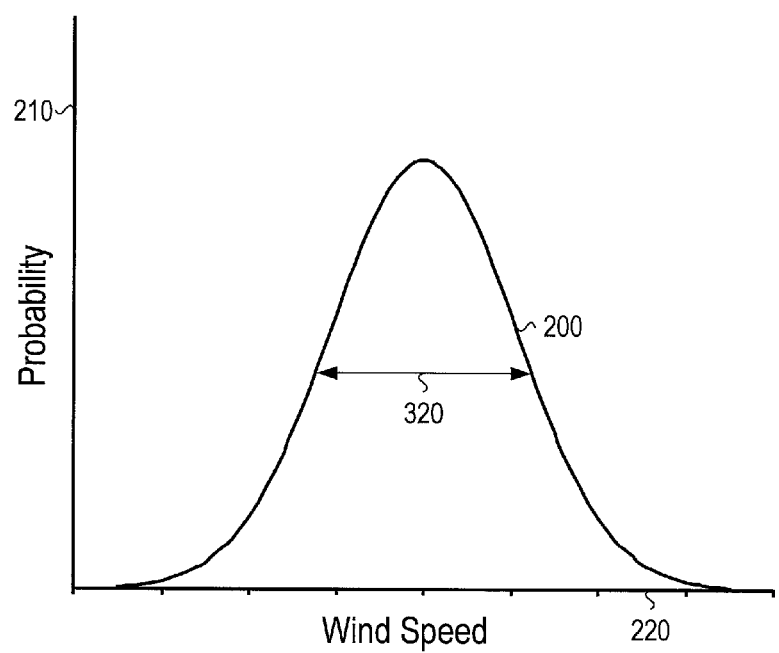
FIG. 2 is an exemplary weather function in accordance with the weather risk estimator of FIG. 1.

Referring to FIG. 2, an exemplary weather function 200 is shown. The weather function 200 is similar to a probability distribution function (PDF), which is well understood in the art, although the weather function 200 differs from the PDF in that a weather function 200 is not required to have an integrated area under the weather function 200 equal to one. For any weather parameter, the weather function 200 is the probability of occurrence of different values of the weather parameter. The weather parameters describe or characterize a weather phenomenon. Examples of weather parameters descriptive of a tropical cyclone intensity, minimum central pressure, wind speed, storm surge height, radius of impact (e.g., extent of hurricane force winds), precipitation rate, and tornado potential. In an embodiment, the probability is normalized, so the area under the curve is equal to one. In exemplary weather function 200 of FIG. 2, the y-axis 210 represents the probability of a wind speed at landfall and the x-axis 220 represents the wind speeds. The peak value of the weather function 200 represents the most probable value of the wind speed. Uncertainty in the wind speed forecast is represented by the width 230 of the weather function. The shape of the weather function 200 in FIG. 2 is exemplary, and should not be considered limiting. Also, the weather function 200 may include discrete probabilities for each range of wind speeds (not shown), instead of a continuous curve shown in FIG. 2.

The weather function 200 is dependent on location. For a weather phenomenon, the probability of occurrence for the weather parameters may be highly location dependent. For example, the weather function 200 for wind speed at the landfall location along a coastline of a tropical cyclone will be very different from the weather function 200 for the wind speed inland of the landfall location, or even 100 miles in either direction along the coastline for the tropical cyclone. The weather function 200 is also weather phenomenon dependent; it is unlikely that two tropical cyclones will exhibit the exact same weather function 200 as each tropical system is unique. In addition, the weather function 200 is time dependent. The weather function 200 is descriptive of the parameters of the weather phenomenon only during the period of time when the data used in determining the weather function 200 is valid. As the forecast for a weather phenomenon is updated, a new weather function 200 should be determined. The weather function may be determined by the WRE 100 or obtained from an external source, such as a weather database 610. The weather databases 610 may be maintained by public agencies, such as the U.S. National Oceanic and Atmospheric Agency, or numerous other private weather forecast agencies or weather data collection centers. The weather functions 200 are determined using techniques well understood in the art, and omission of details herein should not be considered limiting. Furthermore, the probabilistic representation of parameters associated with any earth event can be described with a function analogous to the weather function 200. For example, using climate models, the probability of different changes in sea-level can be determined for a location and time. Similarly, using geologic model, a probabilistic representation of earthquake intensities may be determined. Each of the earth event probabilistic functions can be utilized within embodiments of the WRE 100 as described herein, and are determined using parameters descriptive of the earth events. Within the context of the weather risk estimation system, any parameters of an earth event, weather or otherwise, are collectively referred to as weather parameters.

Figure 3A:
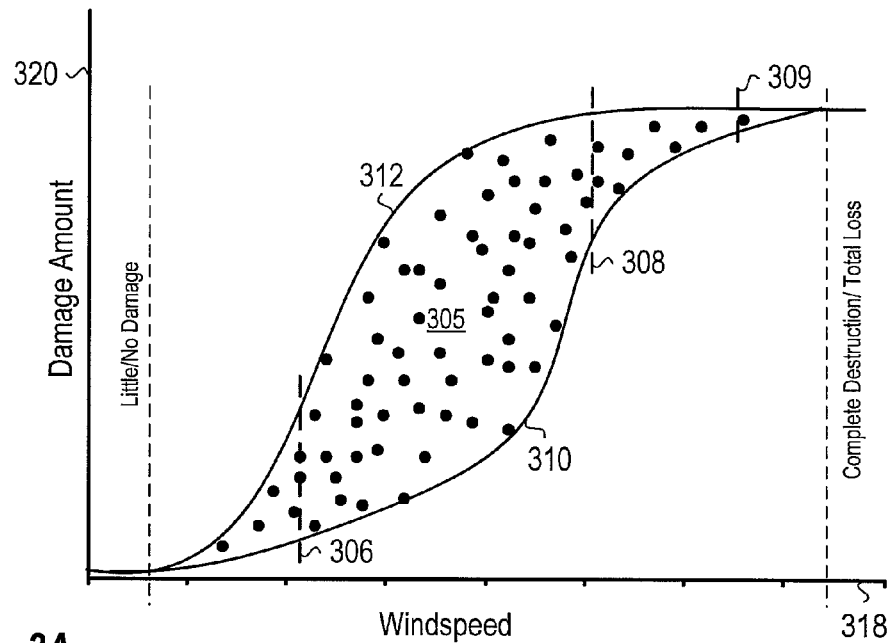
FIG. 3A is an exemplary damage envelope in accordance with the weather risk estimator of FIG. 1.
Figure 3B:
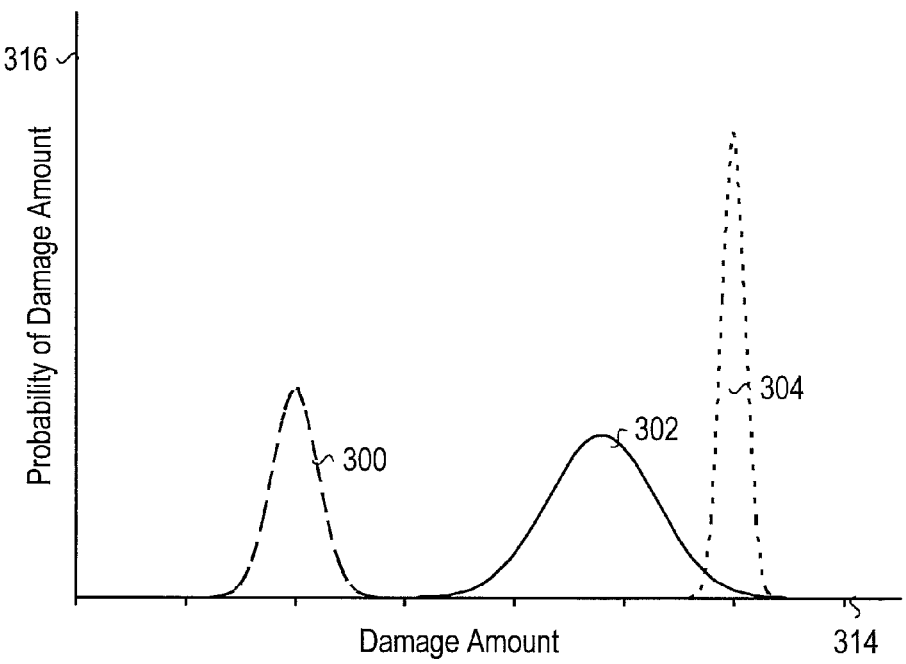
FIG. 3B is an exemplary representation of damage functions in accordance with the weather risk estimator of FIG. 1.

Referring to FIG. 3B, exemplary damage functions 300, 302, 304 used within the WRE 100 are shown. For any weather parameter, the damage function represents a probabilistic representation of damage amounts for different values of the weather parameter. By way of example with respect to wind damage, in FIG. 3B, the y-axis 316 represents the probability of a damage amount and the x-axis 314 represents the damage amount. The damages functions are determined from a damage envelope 305 shown in FIG. 3A. The damage envelope 305 is characterized by an upper damage bound 312 and a lower damage bound 310, forming the damage envelope 305, which includes all potential values for damage values for a weather parameter relative to the interest 630 being represented by the damage function represented in FIG. 3A by an exemplary subset of discrete points within the damage envelop 305. The damage envelop 305 is dependent of the characteristics of the interest 630 (structural materials, population, number and density of dwelling, etc.) as well as the location of the interest 630 (proximity to coast, elevation, boundaries, etc). The upper damage bound 312 is formed along the path connecting the highest potential damage amount for each value of the weather parameter. Similarly, the lower damage bound 310 is formed along the path connecting the lowest potential damage amount for each value of the weather parameter. Each discrete point in the damage envelop represents a potential value of a loss or amount of damage for an interest. These values may be determined using any number of models or algorithms understood in the art. For example, structural models can be used to assess the effects of wind, precipitation, seismic activity, etc on different types of structures using different types of building materials. By modeling a structure or group of structures with one or more models, and determining structural damage, or ranges of structural damages, as the weather parameters are varied, the damage envelope can be formed as damage amounts are attributed to the different levels of damage associated with the variation of the weather parameters. The damage amount may be a real dollar amount, percentage loss, or any other loss indicator. As another example, climate change models may be employed to determine dollar loss for developed land mass as worldwide water levels and temperatures change.

In the exemplary damage envelop of FIG. 3A, the y-axis 320 represents the damage amount and the x-axis 318 represents the wind speeds. Little or no damage is expected the lower wind speeds, while at some large value of wind speed, complete destruction occurs or total loss occurs. At this value of wind speed, the damage amount reaches a maximum and cannot increase any higher with increasing wind speed. Between these two extremes of little/no damage and compete destruction, the lower damage bound 310 and upper damage bound 312 are divergent, indicating for any wind speed a range of potential damage amounts is possible. For an particular wind speed, a vertical slice through the damage envelop 305, referred to herein as a damage slice, represents the probability of damage amounts for that particular wind speed, i.e., the density of discrete points along the damage slice is indicative of the probability for the realization of a damage amount for an occurrence of the weather phenomenon describe by the damage function. Hence, the damage functions are determined by the damage slices. Damage functions 300, 302, 304 in FIG. 3B are determined from damage slices 306, 308, 309, respectively, in FIG. 3A. The damage functions are probability distribution functions, similar to the weather function described above, where each damage function is normalized to one.

The damage functions are not necessarily tied to any particular type of weather phenomenom. Winds from a hurricane, tornado, severe thunderstorm, or artificial wind device may all be expected to yield similar damage functions in absence of other contributing factors, such as rainfall or flooding. Since during a weather phenomenon, damage is often attributed to many different factors, by comparing the damage functions for the different weather parameters, the WRE 100 can rank the weather parameter according to potential for damage. In a hurricane, for example, wind, precipitation, and storm surge all contribute to damage at a location. For locations nearest to the coast, the storm surge damage function may indicate highest potential for damage, while the wind might represent the highest potential for damage, whereas much farther inland as the winds diminish, precipitation may be the predominant damage producer. In an embodiment, the damage functions are determined for an aggregate of weather parameters related to the weather phenomenon. For example, since the maximum sustained winds of the hurricane are often related to the height of the storm surge associated with the hurricane, a damage function that accounts for damage due to both wind and storm surge may be calculated.

Figure 4A:
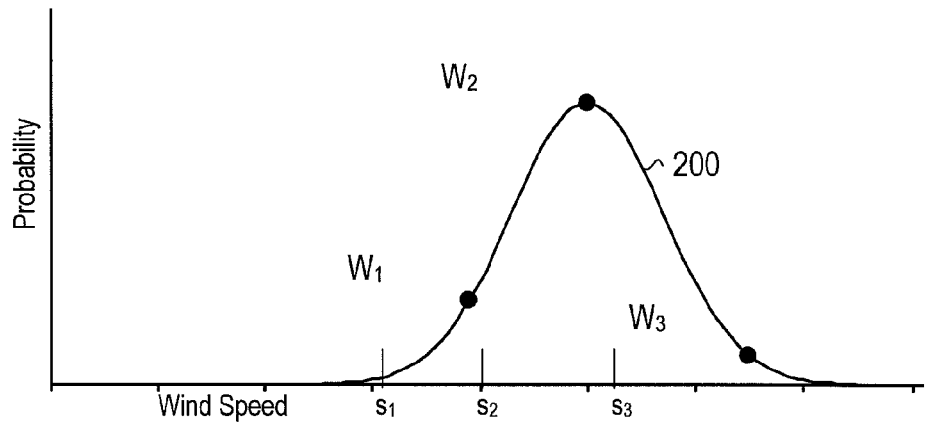
FIG. 4A is an exemplary weather function in accordance with the weather risk estimator of FIG. 1.
Figure 4B:
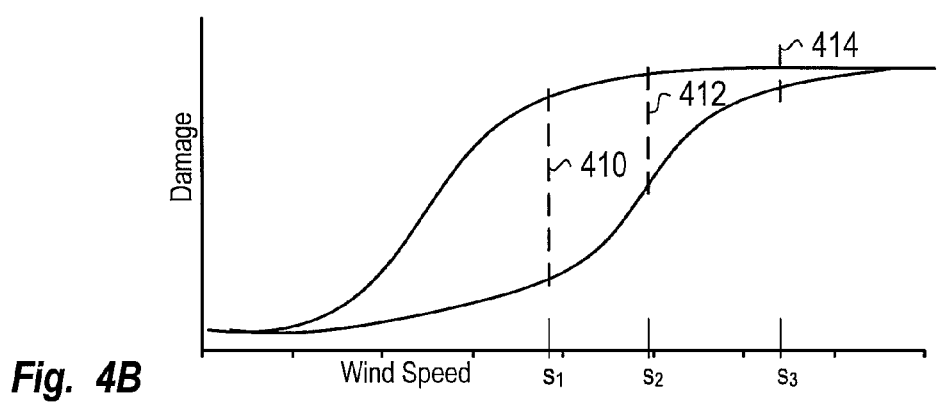
FIG. 4B is an exemplary damage envelope in accordance with the weather risk estimator of FIG. 1.
Figure 4C:
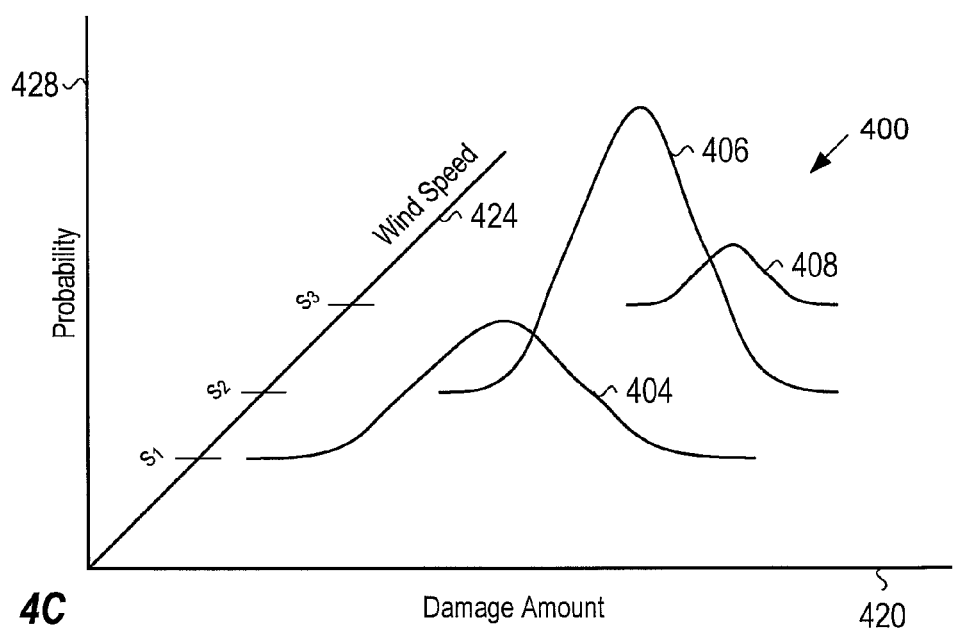
FIG. 4C is an exemplary impact function in accordance with the weather risk estimator of FIG. 1.

Referring to FIG. 4C, an impact function 400 is determined in a combination of the weather function and damage function. The impact function may be used to assess risks associated with a weather phenomenon. The impact function 400 is a multidimensional surface showing the probability of damage for the probable range of weather parameters associated with an actual weather phenomenon. The damage functions 404, 406, 408 in FIG. 4C obtained from the damage slices 410, 412, 414 in FIG. 4B for different values of the weather parameter (indicated by $s_1$, $s_2$, and $s_3$ on the axes in FIGS. 4A-B) are scaled by the probability of occurrence of the values of the weather parameter (denoted as $W_1$, $W_2$, and $W_3$ corresponding to $s_1$, $s_2$, and $s_3$, respectively, in FIG. 4A) obtained from the weather function 200 in FIG. 4A. In other words, each damage function corresponding to a particular value of a weather parameter is weighted by the probability of occurrence of that value of the weather parameter as determined by the weather function 200. For example, in FIG. 4C, the x-axis 420 represents the damage amount and the y-axis 424 represents the wind speeds, and the z-axis 428 represent the probability of damage amounts. The entire set of weighted damage function determined from the damage envelope are aggregated to form the impact function 400 (only three exemplary weighted damage functions 404, 406, 408 are shown in FIG. 4C). Thus, the impact function 400 represents the probability of actual damage amounts over all values of the weather parameter. In an embodiment the total area under the multi-dimensional damage surface is normalized. Thus the highest point of the damage surface represents the most like damage amount associated with a weather phenomenon. The spread indicates uncertainty. This data can be extremely important to users 671 or subscribers 673 (shown below in FIG. 15) of the WRE 100, such as insurers and re-insurers, since losses can be accurately estimated for a tight distribution, whereas for a spread distribution there is much uncertainly in predicting actual losses due to weather phenomena.

It should be noted that the shapes, slopes, and symmetries of the weather, damage, and impact functions shown in FIGS. 2, 3A-B, and 4A-C are for convenience only, and should not be considered limiting. The functions may have any shape, slope, or symmetry required to accurately describe the associated weather and damage parameters. For example, the weather function may be or nearly be a Gaussian distribution, bi-modal distribution, or step function, among others.

Weather, damage, and impact functions may be determined for a single real event, such as the occurrence of an identified tropical cyclone. Alternately, the weather, damage, and impact function may be determined for a probabilistic aggregation of events, such as predicting the outcome of an entire hurricane season based on well-know annual predictions of number of tropical cyclones. In addition, the weather, damage, and impact function may be determined for a single or chain or speculative events, such as earthquakes of different magnitudes centered at certain geographic locations.

As described previously, the WRE 100 may utilize data from a number of various sources and databases. The WRE 100 may access one or more weather databases 610. The weather databases 610 may include short term and long term predictive weather conditions (i.e., forecasts) as well as current weather conditions, where the long term forecast may include a period of several weeks or months in the future, and the short term forecast includes the next few hours or days. The weather database may also contain a collection of historical weather conditions that can be used by the WRE 100. The weather database may contain weather data on the occurrence or expected occurrence of all types of weather phenomenon, including but not limited to, thunderstorms, tornadoes, hurricanes, tropical storms, winter storms, hail, wind, rain, snow, sleet, freezing rain, and fog. The weather databases may also contain various weather or climate models utilized by the WRE in determining the weather functions 200. In an embodiment, the weather databases 610 may contain weather functions 200 obtainable by the WRE 100. In an embodiment, many weather databases 610 are accessible by the WRE 100. The weather databases 610 may be maintained by different weather service organizations or weather data collection agencies, or the databases may contain different type of information, for example, one database for current conditions, another for predictive weather conditions, and a different one for the historical weather conditions. In an embodiment, the WRE 100 includes an internal weather database.

The damage databases 612 utilized by the WRE 100 may include data related to observed damage obtained through mechanical testing to exemplary structures, e.g. placing building models in a wind tunnel and observing the various degrees of damage as the wind speed is increased, simulations and computer modeling, and analysis of damage to real structures damaged by an actual occurrence of an earth event. The damage databases 612 may also include structural characteristics of building materials, as well as model results for how those materials respond to different environmental conditions, such as heat, moisture, wind, ground motion, etc. In addition, the damage databases 612 may include aggregate information about a collection of structures included in geographic areas of varying sizes (such as single street, a zip code, or coastal region), and how the entirely of these structures might be affected by environmental or weather parameters. For example, for one zip code it may be determined that winds of 100 mph may destroy 25% of structures, severely damage 30%, and cause moderate damage to another 45%, but in a neighboring zip code, only 10% of structures will be destroyed, 20% severely damaged, a 70% moderately damaged. The damage databases 612 may also contain various damage or catastrophe models utilized by the WRE in determining the damage functions 200. In an embodiment, the damage databases 612 may contain damage functions 200 obtainable by the WRE 100. In an embodiment, many damage databases 612 are accessible by the WRE 100.

In addition to the data stored in the weather and damage databases, the WRE 100 may utilize many other types data stored in a variety of other public and private third-party databases well known in the art, including geographic data, demographic data, real estate data, financial data, economic data, population data, etc. In the example above, combining the structural damage estimates for a zip code, with economic and real estate data for the zip code, allows the WRE 100 to determine a prediction of an actual dollar amount for losses in the zip code.

Referring generally to FIGS. 6A-6D, class diagrams are illustrated showing attributes and operations associated with each class or metaclass. The class diagrams shown in FIGS. 6A-6D are consistent with those used in UML and serve to better describe and illustrate the methods and systems associated with the weather risk estimation system 50, but do not constrain the implementation of those methods and systems to a particular implementation or computing system, operating system, programming language, or design architecture.

Figure 6A:
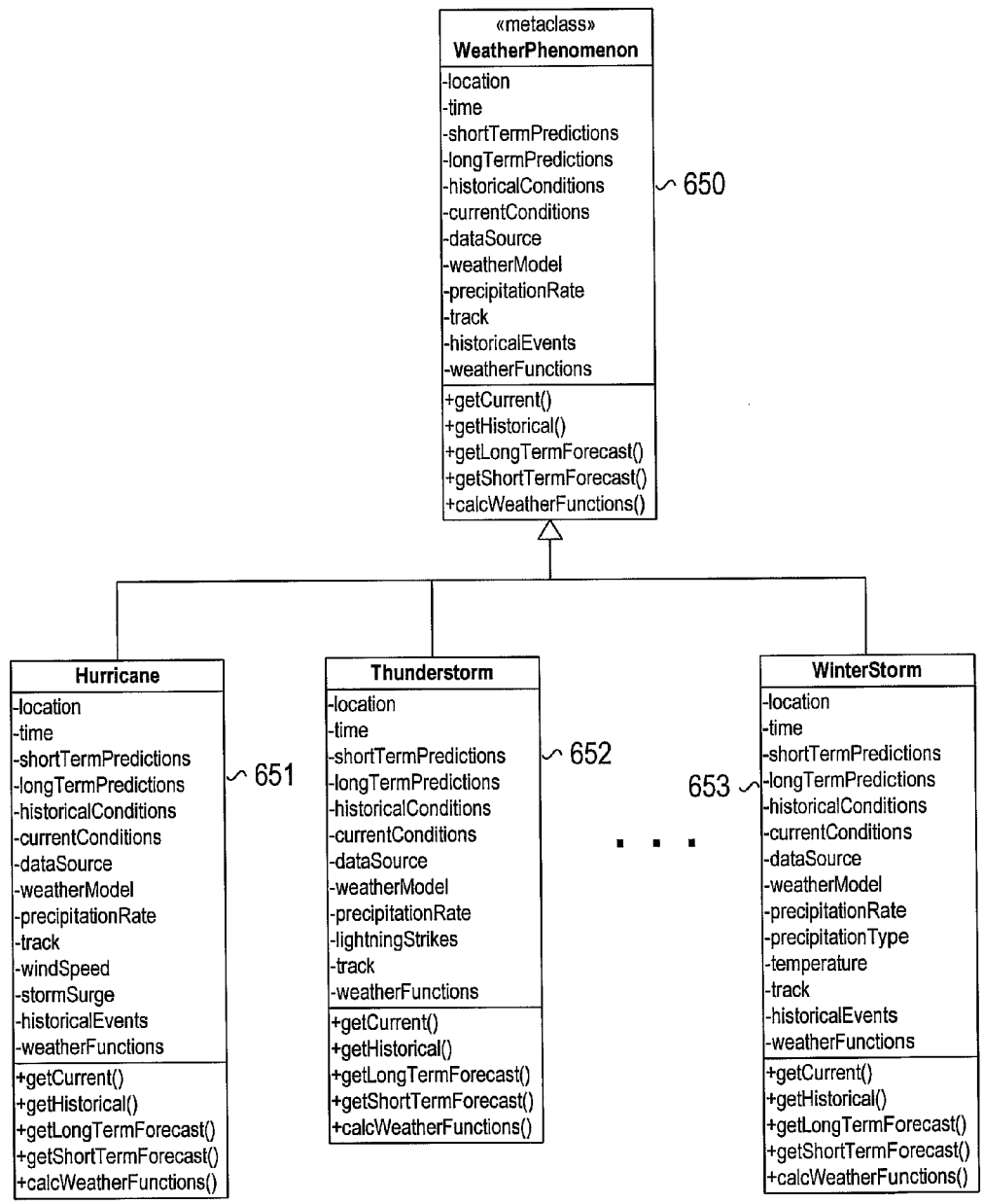
FIG. 6A is a class diagram for weather phenomena according to an embodiment of the weather risk estimator of FIG. 1.
Figure 6B:
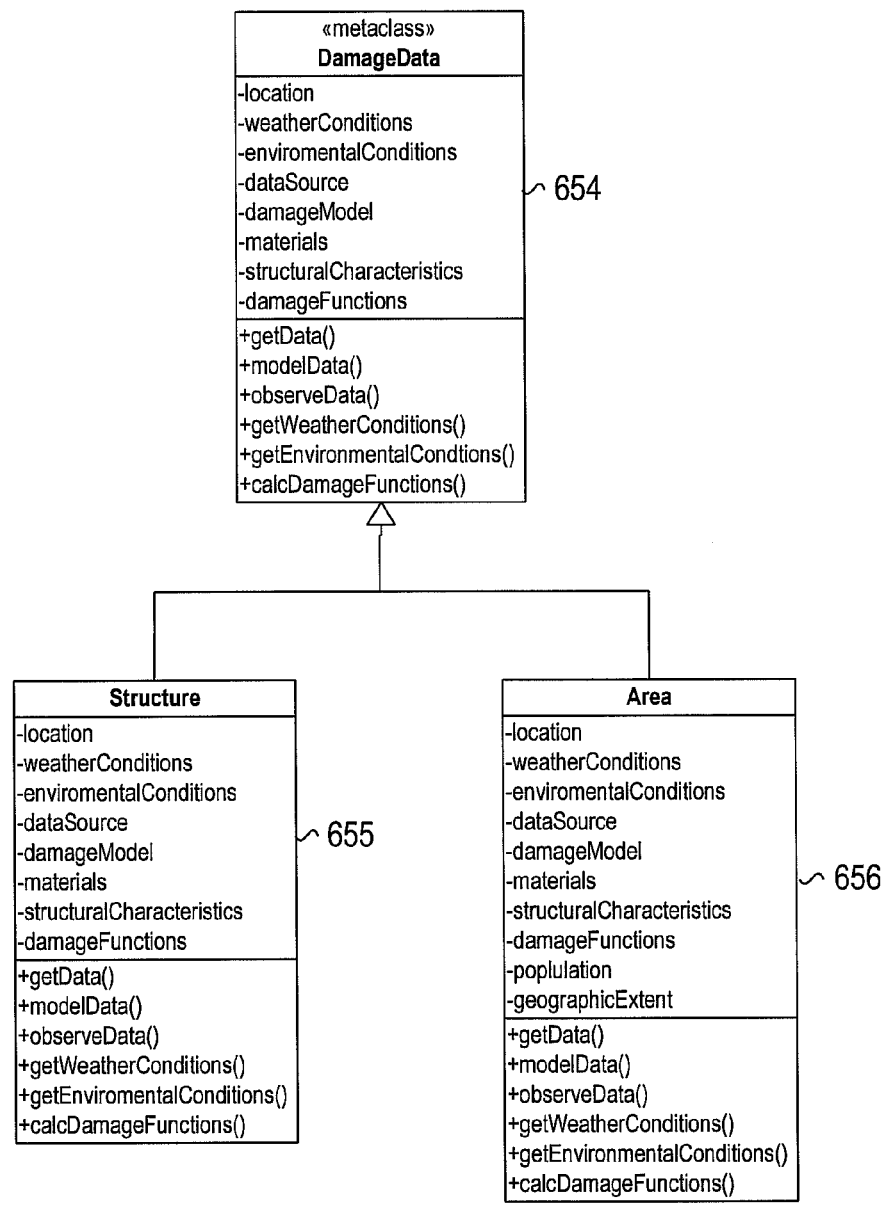
FIG. 6B is a class diagram for damage data according to an embodiment of the weather risk estimator of FIG. 1.
Figure 6C:
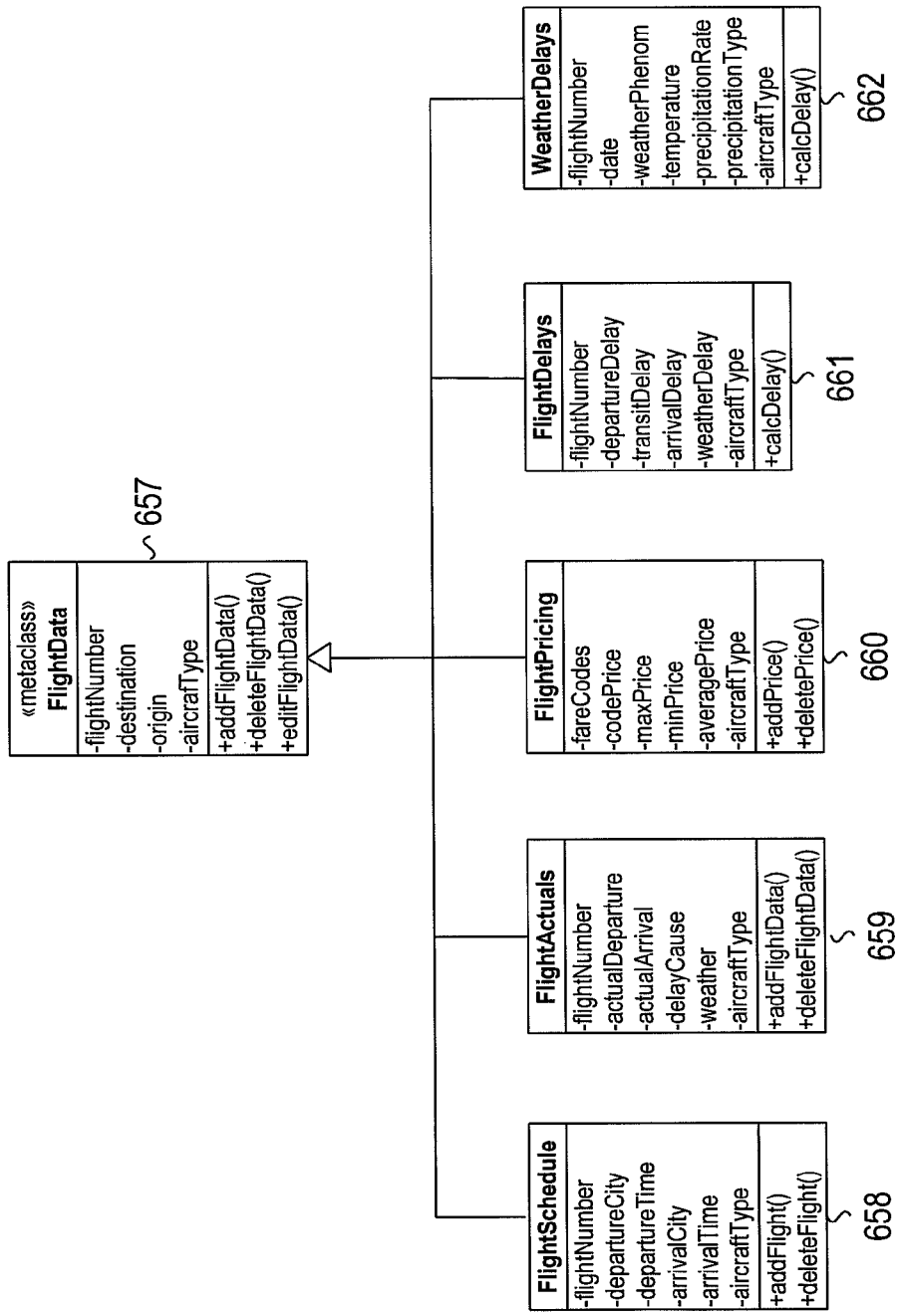
FIG. 6C is a class diagram for flight data according to an embodiment of the weather risk estimator of FIG. 1.

FIGS. 6A-6C illustrate types of classes that can be used to index, store, organize and manipulate data associated with the weather risk estimation system 50. The use of classes does not constrain the types of data to be indexed, stored, organized or manipulated, nor does it limit the mechanisms by which that data is managed. For example, in one embodiment, a relational database may be employed to store all of the weather and damage related information, while in an alternate embodiment an object oriented database is used. By describing the particular attributes and operations which can be performed on certain types of data it is possible to create mechanisms for searching the data for weather phenomenon of interest, identify those weather phenomenon of interest, and subsequently form weather functions which can be used to develop impact functions, as is described herein.

Referring to FIG. 6A, a weather phenomenon metaclass 650 is defined which contains a number of basic attributes and operations associated with a weather phenomenon. Classes associated with weather phenomenon metaclass 650 can include, but are not limited to, a hurricane class 651, a thunderstorm class 652, and a winter storm class 653. For each of these classes, particular attributes and operations may be defined as are applicable to that class. For example, a storm surge attribute can be associated with a hurricane class 651, but is not applicable to a thunderstorm or winter storm.

FIG. 6B illustrates a number of classes associated with damage assessment, including a damage data metaclass 564, a structure class 565, and an area class 566.

Figure 5:
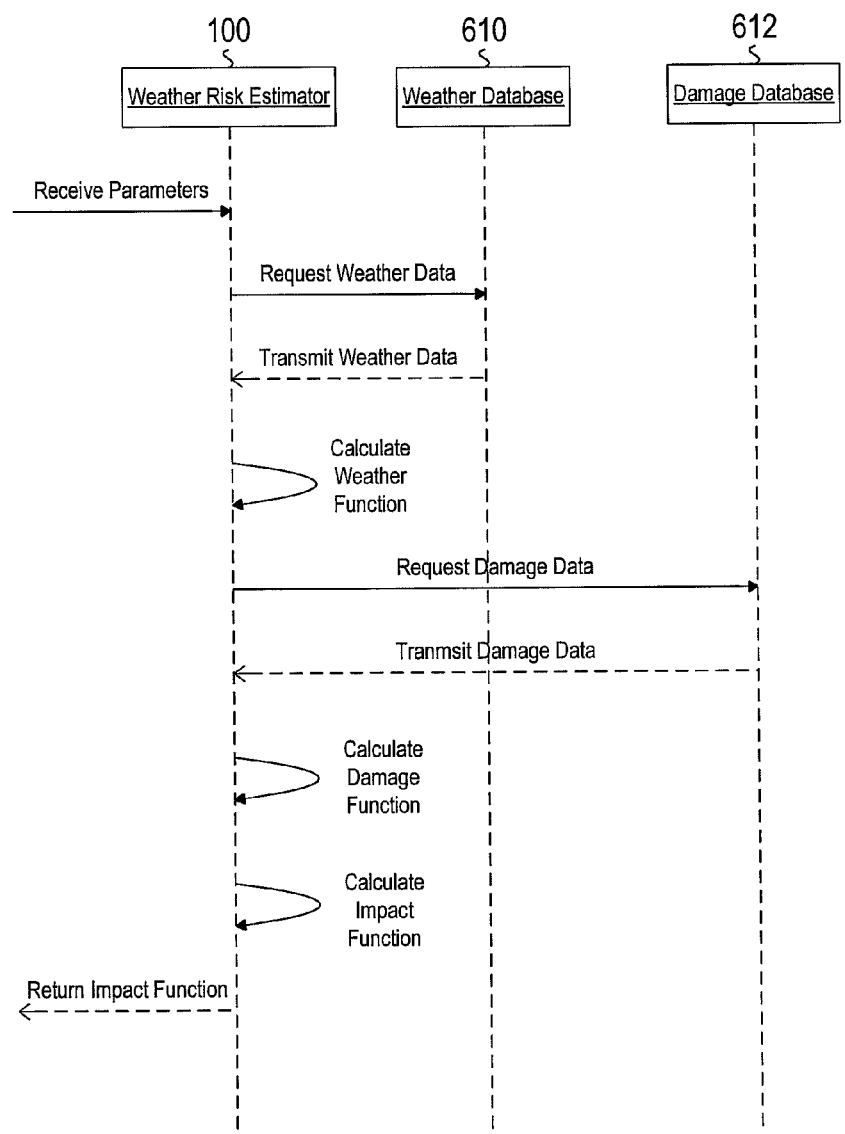
FIG. 5 is a sequence diagram according to an embodiment of the weather risk estimator of FIG. 1.

FIG. 5 is a sequence diagram of an embodiment for the determination of an impact function 400 by the WRE 100. Parameters related to an interest 630 are obtained by the WRE 100. These parameters may be obtained from many different sources, including users 671 of the WRE 100, or a provider 620 using the WRE 100. The parameters from the provider 620 may have been previously obtained from a user 671 and may be stored in an internal provider database, or the parameters may be determined by the provider 620. The parameters obtained by the WRE 100 may also be retrieved from an internal database. The parameters are used to determined relevant information in determining the impact function for the interest, such location, time, property data, user activity. When the location and time have been determined, the WRE 100 requests weather data from one or more weather databases 610, as described above. The weather data obtained from the weather databases 610 is used to calculate the weather function, described above. The WRE 100 also requests damage data from one or more damage databases 612, previously described, that is relevant to the interest. The received damage data is used to calculate a damage function as described above. In one embodiment, either or both of the weather and/or damage functions are obtained from a third party, for example, third party vendors associated with the weather and damage databases, instead of being determined by the WRE 100. Using the weather and damage functions, the multi-dimensional impact function 400 is determined, as describe above. The impact function is then returned to an entity, such as the user 671 or provider 620 for further processing. For example, the impact function may be returned to a provider 620 in order to determine pricing for an offer of good or services related to an interest 630 of the user 671, or to a third party vendor or provide value added services related to an interest 630 of the user 671. The impact function may also be utilized by the WRE 100 in providing the visualization or offering products or services to a user 671 related to the interest 630 of the user 671. One example of a product or service related to an interest 630 of a user 671 is an insurance policy.

Figure 7:
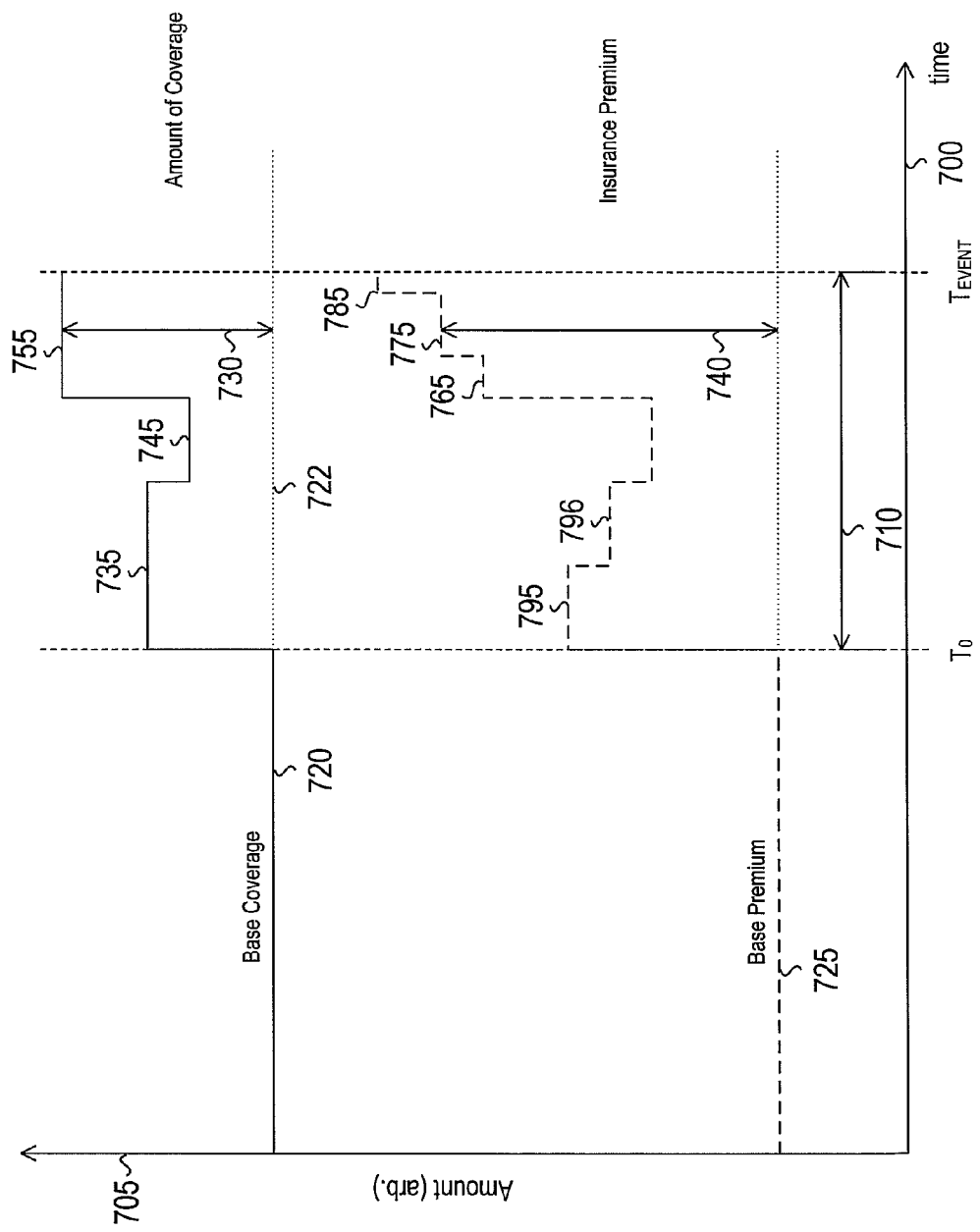
FIG. 7 is an exemplary representation of policy pricing according to an embodiment of the weather risk estimator of FIG. 1.

The WRE 100 or provider 620 using the WRE 100 may offer to a user 671 a new insurance policy or an increase in coverage to an existing policy by assessing risk associated with an earth event affecting an interest 630 of the user. Policy cost and coverage amounts may be dependent on the time relative to the earth event predicted to affect the interest 630 of the user 671. Referring to FIG. 7, an exemplary comparison of the amount of insurance coverage and the cost of a policy or the insurance premium is shown as a function of time relative to the identification and impact of an earth event. The x-axis 700 represents time, where $T_0$ represents the time where an earth event is first identified, and $T_{EVENT}$ represents the time that the earth event is expected to affect the interest 630. The time between $T_0$ and $T_{EVENT}$ is referred to as the forecast period 710. Prior to the forecast period 710 (e.g., the identification of an earth event of potential impact to an interest 630 to be insured), the insurance premium for the interest 630 is offered at the base premium 725 for a base coverage amount 720. This pre-forecast period premium is calculated using statistical and actuarial analysis well understood in the art.

Once an earth event has been identified, an insurer may choose to provide additional coverage 730 to its policy holders for an additional premium 740. The insurer may determine additional coverage 730 to a base coverage 720 based on receiving weather and/or environmental data related to the earth event, such as an impact function 400 for a weather phenomenon. The additional coverage 730 is offered for an additional premium 740. The additional premium 740 may be influenced by several factors, such as the additional coverage 730 estimated using a severity of the earth event at the impact location, the uncertainty in the forecast of the earth event at the impact location, and the time before the expected impact ($T_{EVENT}$). For example, during the forecast period 710 for a hurricane, the intensity of the hurricane may fluctuate, as a result the amount of additional coverage 730 offered by the insurer may increase or decrease with forecast strengthening or weakening of the storm, respectively, a the impact location. This can be represented by the different steps 735, 745, 755 in the amount of coverage line in FIG. 7. The additional premium 740 is generally priced according to the additional coverage amount 730, although for any additional coverage 730, the additional premium 740 may change during the forecast period based upon updated information related to the hurricane. A greater uncertainty in the impact of the hurricane at the impact location may result in a higher additional premium 740 than when the uncertainly in the storm is lower, even for the same amount of additional coverage 730, again as indicated in FIG. 7 by the steps 765, 775, 785 in the insurance premium line. In one embodiment, the insurer may decline to offer additional coverage if the uncertainty is below a predetermined threshold. For low impact uncertainty, the impact of the hurricane can be predicted with high confidence. For a catastrophic event, the insurer may determine the expected losses from the hurricane cannot be recovered through any offering of additional coverage.

The time of purchase of the additional coverage 730 prior to the time of impact of the hurricane at the impact location may also affect the pricing of the additional premium 740, as indicted by the steps 795, 796 corresponding to amount of additional coverage step 735 in FIG. 7. In one embodiment, the amount of additional coverage 730 may be requested by the policy holder from a self-assessment of additional damages potentially incurred by the earth event, instead of suggested by the insurer. In one embodiment, the insurance premium during the forecast period is variable as represented by steps 765, 775, 785, 795, 796 in FIG. 7, while the amount of coverage does not change from the basic coverage 722 from the period prior to the forecast period 710, corresponding to a situation when an uninsured person attempts to purchase insurance in response to the identification of an earth event potentially impacting their interests. In this case, the insurance premium offered by the insurer changes after the identification of the earth event. Although the base coverage 720 does not change, the additional premium 740 is determined in response to estimating using the expected severity of the earth event at the impact location, the uncertainty in the forecast of the earth event at the impact location, and the time before the expected impact. In one embodiment, the insurer may decline to offer any insurance if the uncertainty is below a pre-determined threshold. For low uncertainty, the impact of the hurricane can be predicted with high confidence. For a nearly-certain catastrophic event, the insurer may determine the expected losses from the hurricane will exceed gains from the sale of insurance products, and therefore decline to offer any insurance for such an low uncertainty event. Conversely, if the uncertainty of the occurrence of a catastrophic event is high, the insurer may offer high priced insurance premiums to protect policy holders against the relative unlikely, but still realistically probable occurrence of the event resulting in catastrophic losses. One skilled in the art will appreciate that distribution functions describe as having fat, long, and/or heavy tails are representative of high uncertainty probability distribution functions.

Figure 6D:
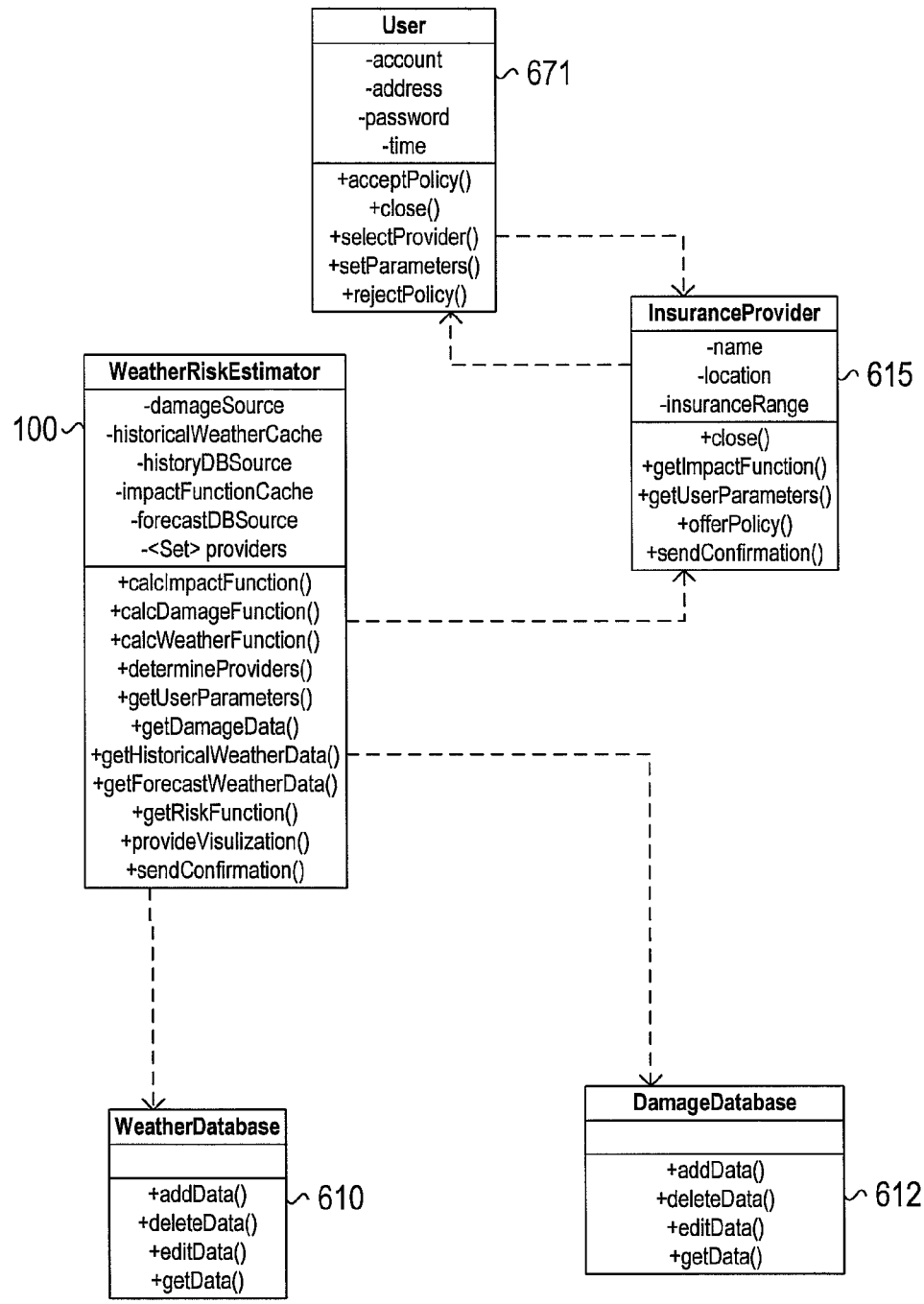
FIG. 6D is a class diagram according to an embodiment of the weather risk estimator of FIG. 1.
Figure 8:
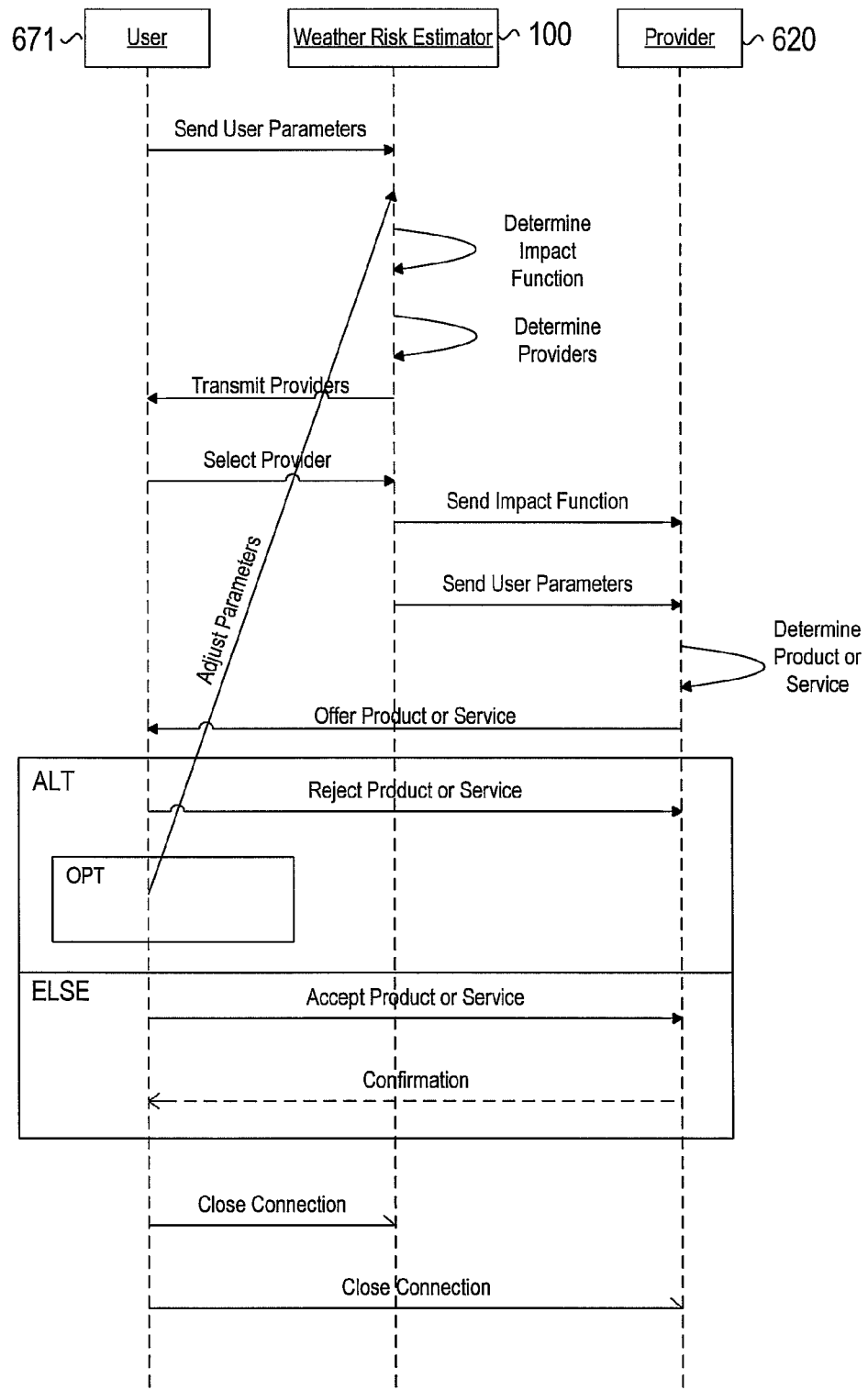
FIG. 8 is a sequence diagram according to an embodiment of the weather risk estimator of FIG. 1.

The WRE 100 may be used to provide an opportunity for a user to purchase products or services related to an interest 630 of the user 671 impacted by an earth event offered by a provider 620 external to the WRE 100. Referring to FIG. 8, a user 671 interacting with the WRE 100 inputs user parameters. The WRE 100 determines an impact function 400 corresponding to an earth event expected to impact the user. The WRE 100 also determines potential providers 620 or products and services that may be of interest to the user based on the occurrence of the earth event and the interests 630 of the user 671. The providers 620 may be selected based on arrangement or contract between the providers 620 and the WRE 100. A list of potential providers 620 and their corresponding product or service is transmitted to the user 671. The providers 620 may all be vendors for the same product or service, or alternately different products and services of perceived interest to the user 671. The user 671 is prompted to select one or more of the providers 620 if the product or service is of potential interest. If the user 671 selects a provider 620, the WRE 100 transmits the impact function 400 related to the interest of the user 671, as well as user parameters to the selected provider 620. Using the impact function 400 and the user parameters, the provider 620 determines what product and service, and associated pricing to offer to the user 671. The user is further prompted to reject or accept the offer for the products or services. If the offer is rejected, the user 671 is optionally provided with an opportunity to change the user parameter. The new user parameters are used by the WRE 100 to determine a new impact function 400, and provide an updated list of providers 620 to the user 671. If the user 671 accepts the offer for the product or service, transaction is completed between the user 671 and provider 620 using methods of e-commerce well understood in the art, and lack of further description here should not be considered limiting. FIG. 6D is a class diagram for the weather risk estimation system 50 showing attributes and operations for the systems and actors of an embodiment described in FIG. 8 where the provider 620 is an insurance provider 615.

Figure 9:
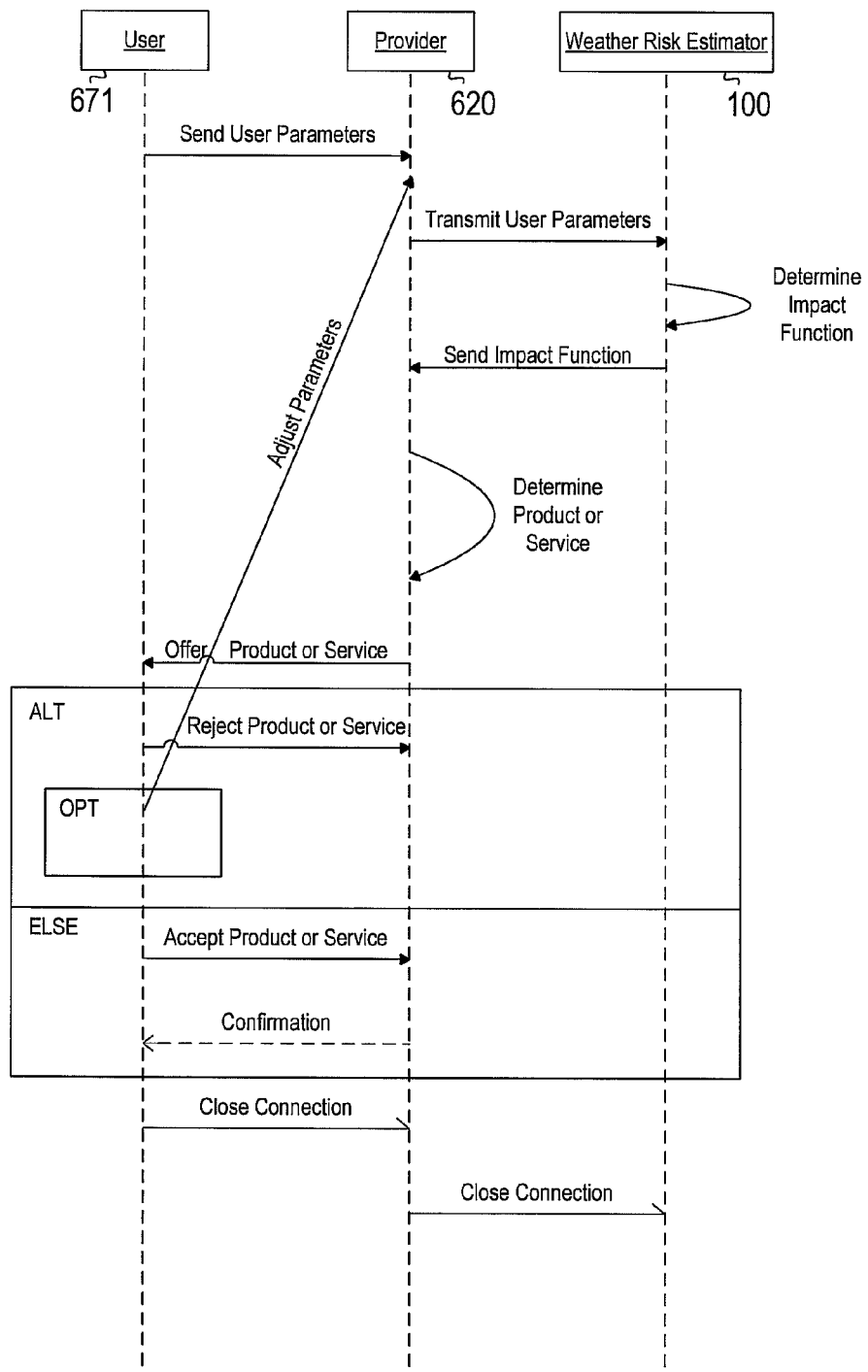
FIG. 9 is a sequence diagram according to an embodiment of the weather risk estimator of FIG. 1.

Referring to FIG. 9, a provider 620 may utilize the WRE 100 in providing products or services to a user 671. The user 671 may be soliciting the products or services from the provider 620, for example, by visiting a website associated with the provider 620, or the provider may solicit the products or services to the user 671 based on a perceived need for the product or service by the user 671 based on an earth event impacting the interests 630 of the user 671. The solicitation may be through a targeted advertisement on a website visited by the user 671, an email or other electronic message transmitted to the user 671, or other advertising methods well understood in the art. Once a connection between the user 671 and the provider 620 has been established, user parameters received from the user 671, are transmitted by the provider 620 to the WRE 100. The WRE 100 calculates an impact function 400 based on the parameters, as describe previously, and returns the impact function 400 to the provider 620. Using the impact function 400, the provider can determine an appropriate product or service of potential interest to the user and make an offer for product or services priced according to the impact of the earth event on interest 620 of the user 671. The user 671 may accept or reject the offer. If the offer is rejected, the user 671 may be given the opportunity to change the user parameters. The provider would then transmit the new set of user parameters to the WRE 100, for which the WRE 100 returns an updated impact function 400. A new offer is presented to the user 671 for acceptance or rejection. Once the offer has been accepted the purchase of the product or service is completed and confirmed and the connection is closed. Methods of completing electronic commerce transactions are well understood in the art, and lack of further description here should not be considered limiting.

Figure 10:
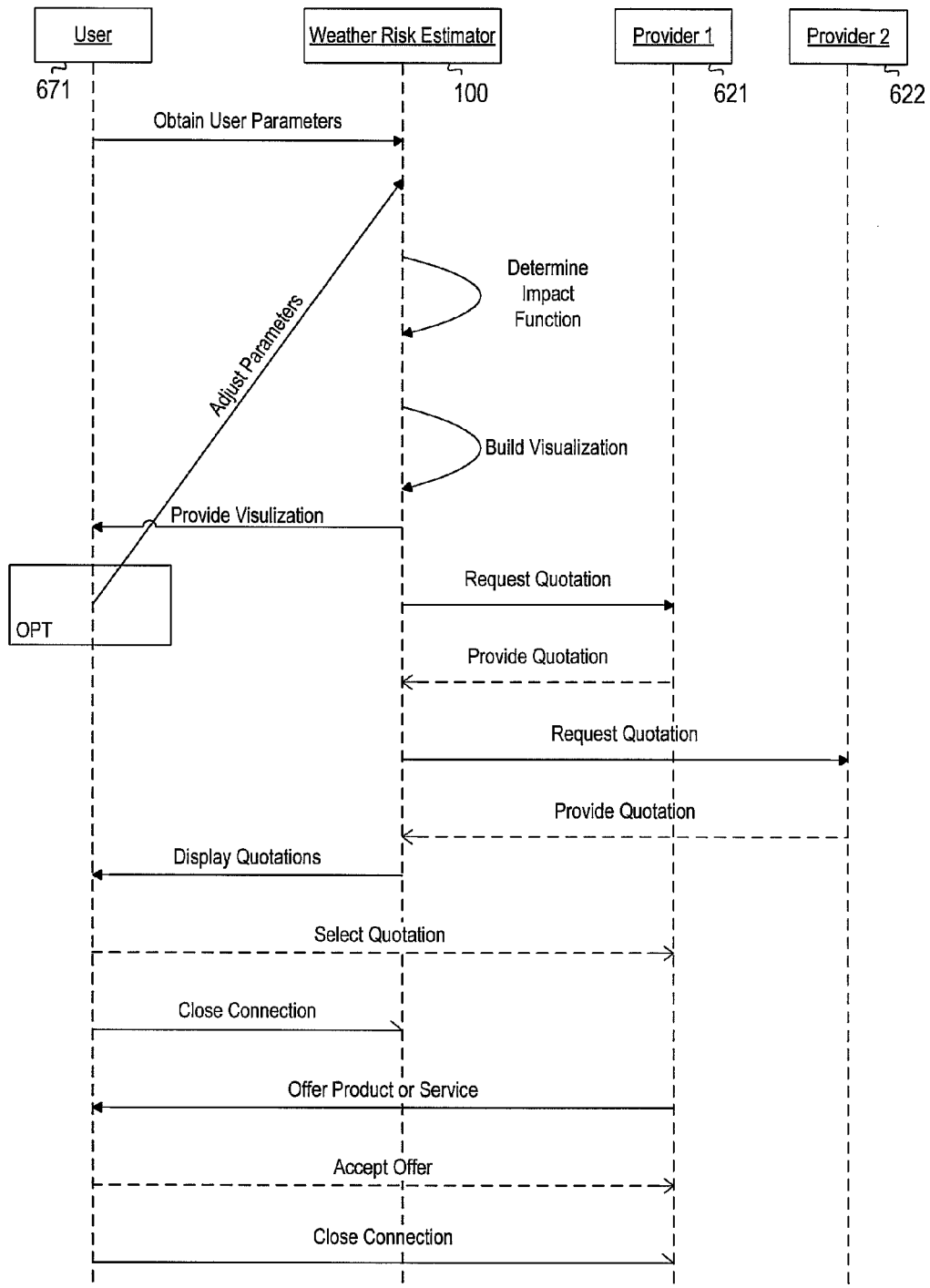
FIG. 10 is a sequence diagram according to an embodiment of the weather risk estimator of FIG. 1.
Figure 11:
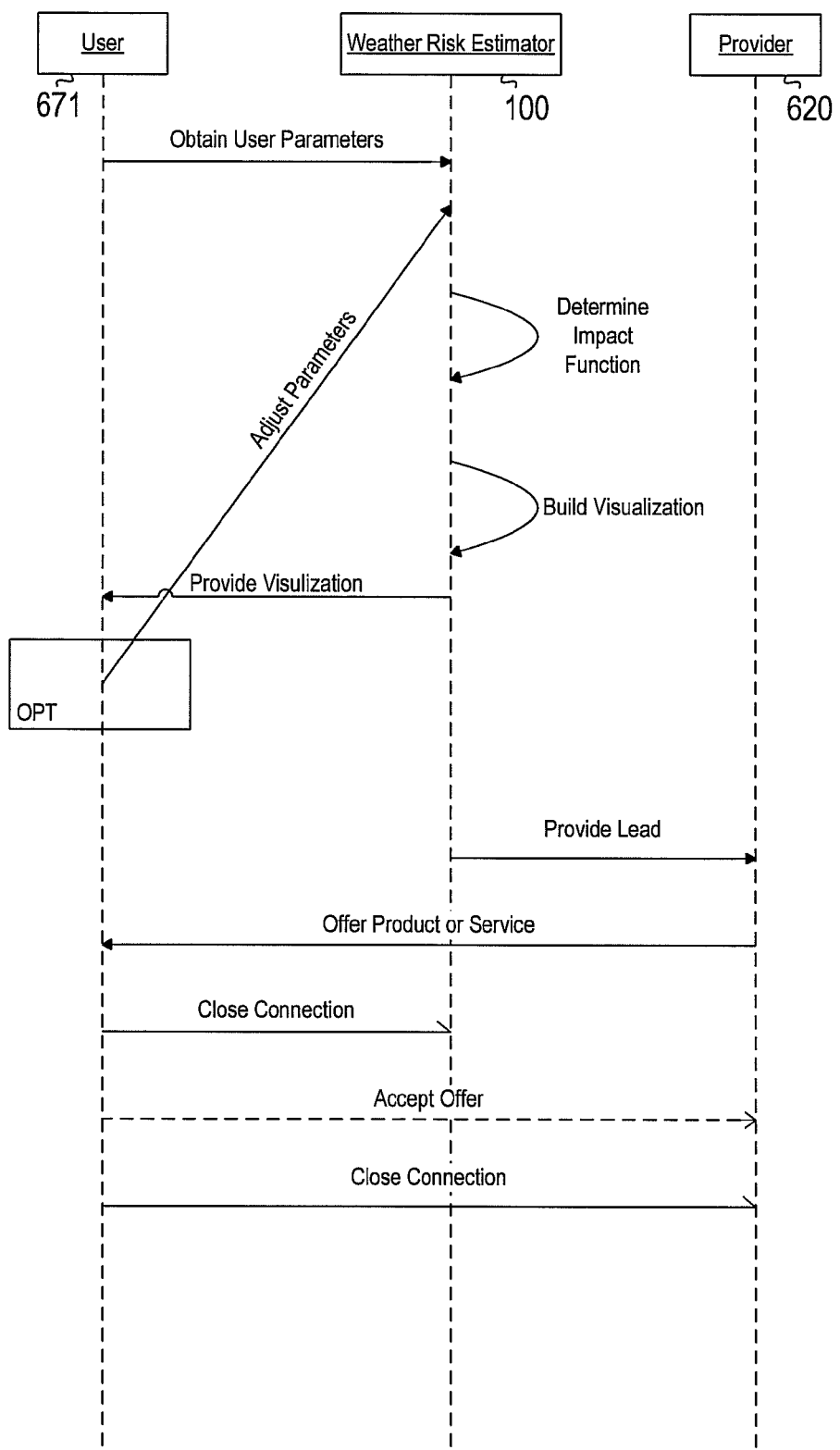
FIG. 11 is a sequence diagram according to an embodiment of the weather risk estimator of FIG. 1.

Referring generally to FIGS. 10 and 11, the WRE 100 may be used utilized for providing a visualization of the impact of an earth event on interests 630 of a user 671. The WRE 100 obtains user parameters and determines an impact function 400 using those parameters, as described previously. Using the impact function, the WRE 100 builds a visualization related to the interest 630 of the user 671. The visualization may be created using techniques well know in the art, including data fusion and mashup. The visualization is provided to user equipment 667 with display device, associated with the user 671, to allow the user 671 to see a visual representation of the effect of the earth event on their interest 630. In an embodiment, the visualization includes a representation of an actual interest 630 of the user 671, and modifies the actual representation to show the effects of the impact of the earth event. For example, the WRE 100 may obtain an actual image of the user's home from any number of publicly available sources or databases, such as satellite imagery databases, Google StreetView, and Microsoft LiveEarth. Alternately, the image may be uploaded to the WRE 100 by the user. The WRE 100 may then modify the actual representation of the user's home to show the effects of wind damage, flooding, or any other parameter related to the visualization, for example, roofing or siding damage for high winds, or water level for flooding. The visualization may be navigated using any number of techniques well known in the art including zooming in and out, panning, rotating, and change in elevation. The visualization is not limited to a single property, but may be extended to include entire neighborhoods, cities, or other widespread areas. In a neighborhood, for example, damage functions for the different types of structures (e.g. wood, stone, hi-rise) are obtained. The damage to each structure in the neighborhood is determined and a composite visualization is obtained that allows a user to navigate in two or three dimensions through the neighborhood to assess the potential damages. In an embodiment, damage functions for other landmarks such as bridges, communication towers, and trees, are obtained, and potential impact to those landmarks in included in the visualization. In an embodiment, the actual images used in the visualization are computer generated graphic representations of actual structures are substituted.

The user may optionally be given an opportunity to adjust some of the parameters used in building the visualization in order to visualize how the impact may be changed. The parameter may include the weather and/or environmental parameters associated with an earth event, structural parameters related to the user's interest 630, or time with respect to the impact of the earth event on the interest 630. In one embodiment, the user is presented with one or more sliders, such that selection of a slider with a pointing device and moving the slider to increase or decrease the parameter results in a substantially continuous change in the visualization. For example, if the earth event is an earthquake, a slider corresponding to a change in intensity of the earthquake may show increasing damage as the intensity of the slider is increased. The slider may also provide visual ques regarding expected occurrences of the earth event. For example, for a given location, the slider may indicate the relative probability of occurrence of an earthquake for different intensities predicted to occur within a certain time period. The WRE 100 in this way can provide a user 671 with a visualization for which they can make a determination of their tolerance based on a predicted visual impact to their own property.

The visualizations may also be used to determine impact of an earth event of much broader geographic region, such as an indication of how increasing water levels, due to a prolonged rainfall event, a hurricane, or sea level rise, will impact access to a geographic area due to roadway flooding. Potential damage to bridges or causeways, and flooding of roadways can utilized by emergency planners in determining most critical areas for evacuations, or enable rescue and relief workers to plan ingress to regions predicted to be impacted by the earth event.

After the visualization is provided to the user, the WRE 100 may either aggregate offers for products or services from one or more providers 620, or furnish a lead to the providers 620 for a direct offer of the products or service to the user 671. In FIG. 10, the WRE 100 solicits providers 621, 622 of products or services for quotations of their products that are relevant to the interest 630 of the user 671 represented in the visualization. For the providers 621, 622 returning quotations, the WRE 100 displays these offers to the user 671, as described above. If the user selects a quotation, they are connected to the provider 621 to complete the transaction for the product or service. In FIG. 11, the WRE 100 provides a lead to a provider 620 that a user of the WRE 100 may be interested in a product or service offered by the provider 620. The provider 620 directly contacts the user 671 to offer the product or service, and the transaction is completed directly with the provider 620 using methods well understood in the art.

Figure 12:
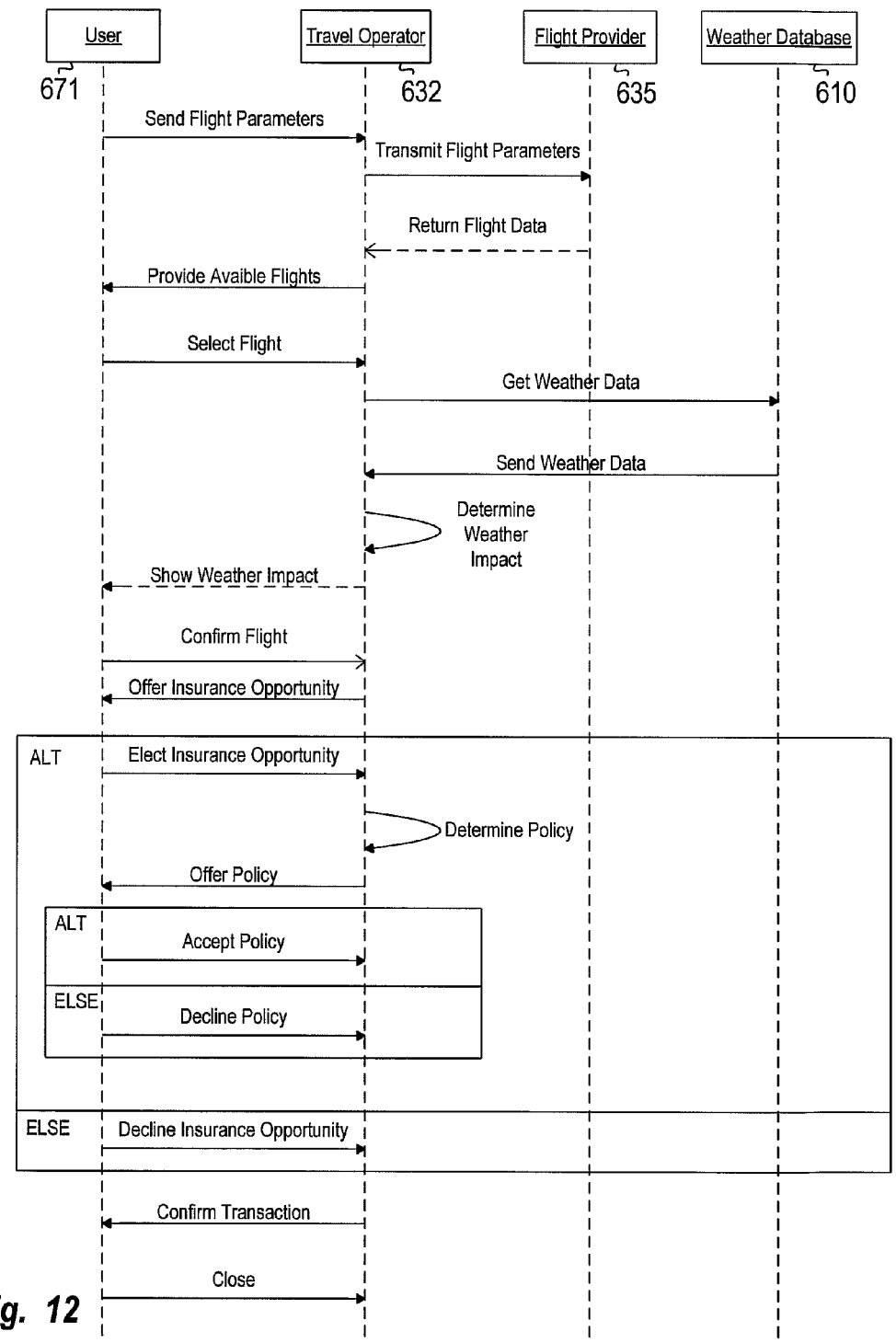
FIG. 12 is a sequence diagram according to an embodiment of the weather risk estimator of FIG. 1.

In alternate embodiments, the WRE 100 may also be utilized to provide products or services without the use of an impact function 400. Instead the WRE 100 may obtain historical and predictive weather data, and determine the impact of the weather data on the product or service, where the pricing for the product or service is dependent on the weather impact, e.g., as describe previously in the insurance policy example of FIG. 7. A determination of a supplemental offering related to the product or service may also be provided by the WRE 100, where pricing for the supplemental offering is dependent on the impact of historical and predictive weather data on the product or service. An example of a supplemental offering is an offer for travel insurance policy when purchasing an airline ticket or planning a vacation. As an example, referring to FIG. 12, a user 671 provides a travel operator 632 with flight parameters, such as origin and destination airport, departure and/or arrival dates/times, number and ages or travelers, etc. Travel operators include such entities as travel agencies, on-line ticket brokers, etc. The travel operator 632 obtains from a flight provider 635 (or alternately a flight operations database—not shown), flight data that matched the user parameters. The flight data includes flight segments for completion of a trip, cost, aircraft type, on-time percentage, etc. The travel operator 632 formats the flight data for presentation to the user 671, allowing the user 671 to make a flight selection. Once the flight has been selected, the travel operator 632 obtains weather data from one or more weather databases 610 in order to determine how the historical weather patterns or predicted future weather conditions might impact the flight. The impact (e.g., delay or cancellation probability) is shown to the user 671. The user 671 confirms the selection of the flight, and the travel operator 632 presents the user 671 with offer for an insurance opportunity. If the user 671 elects to pursue the insurance opportunity, the travel operator 632 determines appropriate policy and pricing, and presents the policy to the user 671. If the user 671 elects the offer, the policy may be purchased using any number of techniques well known in the art for completing an e-commerce transaction. In an embodiment, the travel operator provides several policy options for the user to select. In an alternate embodiment, the travel operator 632 is the flight provider 635 (i.e., the user 671 purchases airline tickets directly from an airline).

Referring to FIG. 6C, a flight data metaclass is defined with contains a number of basic attribute and operations associated with aircraft flights and flight delays, Classes associated with the flight data metaclass 567 include a flight schedules class 568, a flight actuals class 569, a flight pricing class 660, a flight delays class 661, and a weather delays class 652.

Figure 13:
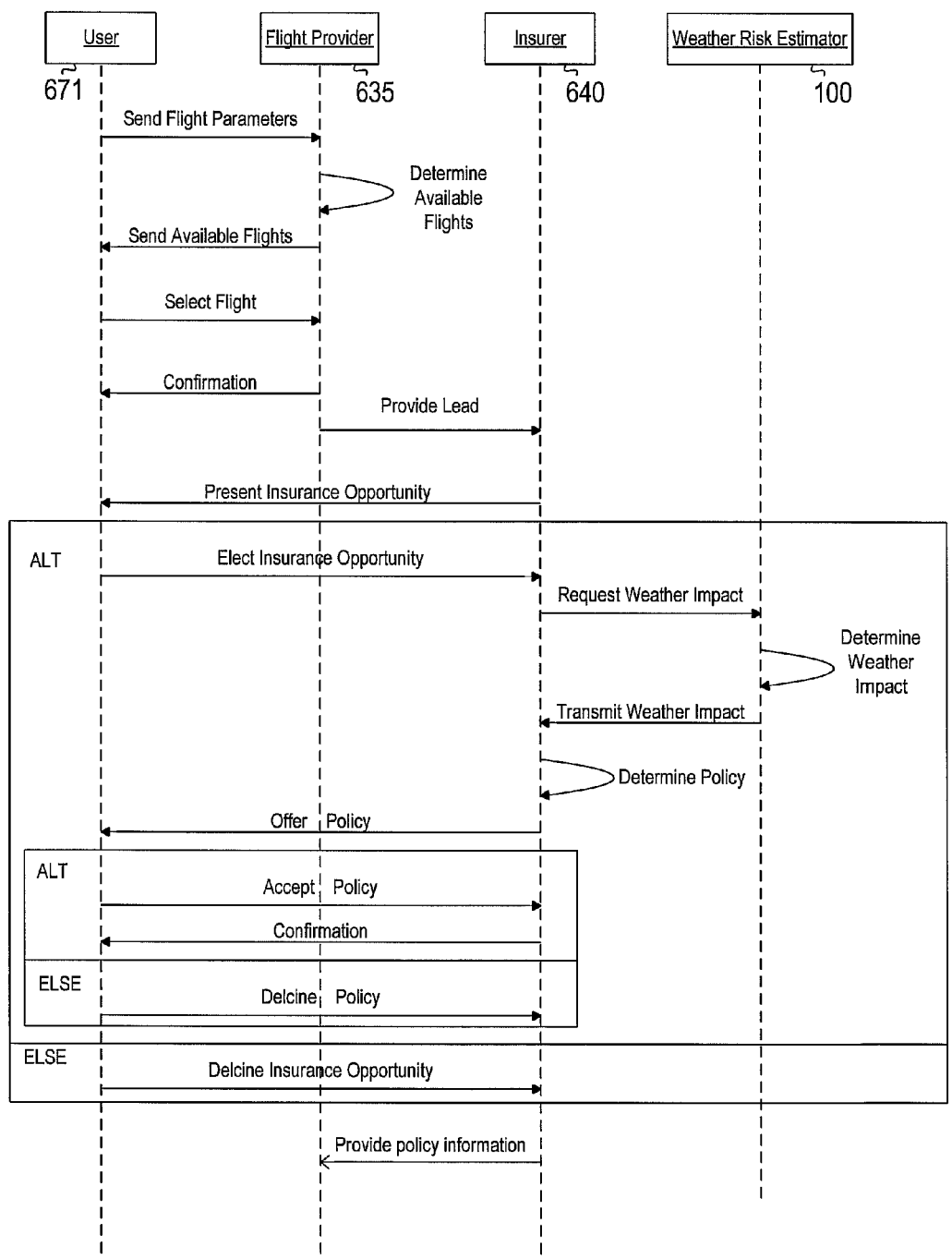
FIG. 13 is a sequence diagram according to an embodiment of the weather risk estimator of FIG. 1.

Referring to FIG. 13, a user 671 purchasing an airline ticket is presented an opportunity to purchase a travel insurance policy through a referral of the user 671 to an insurance provider 640 from the flight provider 635. The user 671 purchases an airline ticket directly from a flight provider 635 or a travel operator (not shown) over a network using methods well understood in the art. Once the purchase transaction has been completed, the flight provider passes a lead to an insurance provider 640 of the purchase, and the insurance provider 640 presents the user 671 with an offer of an insurance opportunity related to the user's flight. The offer may be presented via a targeted advertisement on the website that the user visited to purchase the e-ticket, or an option after the purchase is complete may provide the user a pass through directly to a website for the insurance provider 640. Alternately, the insurance provider 640 may solicit the user 671 via an email or telephone call to the user 671 from information collected about the user 671 in the purchase of the e-ticket. Once the user 671 has indicated an interest in the insurance opportunity, the insurance provider 640 obtains weather data from one or more weather databases 610 related to the user's purchased flight. The insurance provider 640 determines a policy, or alternately several policy options, using the weather data and presents the policy options to the user 671. If the user 671 elects to purchase the policy, the transaction is completed as described previously. Optionally, the insurance provider 640 may provide the policy information back to the flight provider 635 or travel operator 632.

Figure 14:
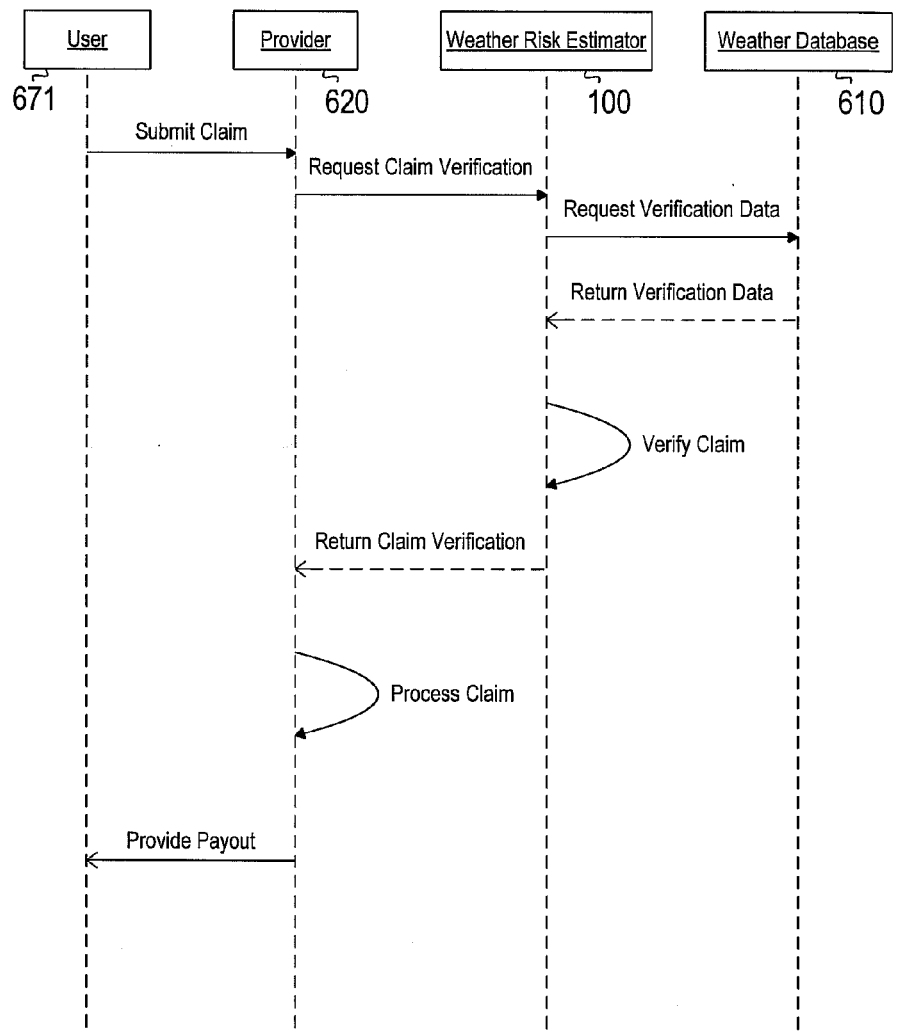
FIG. 14 is a sequence diagram according to an embodiment of the weather risk estimator of FIG. 1.

Referring to FIG. 14, a user 671 affected by an earth event may file a claim to collect damages incurred on their personal property or interests 630 resulting from the earth event for which they have purchased protection. In order to receive compensation, the user 671 files a claim with the policy issuer. The policy issuer may require a verification of data related to the earth event, such as rainfall amount, wind speed, earthquake severity, temperature change, etc. before payment is made to the users. The policy issuer requests verification data for the earth event from the WRE 100. The WRE 100 obtains weather data from the weather databases 610 utilized by the WRE 100 in order to verify the actual data corresponding to the occurrence of the earth event at a particular location and the impacts of the earth event on the insured property or interest 630. If the verification data confirms that the allowable limits of parameters associated with the earth event, as specified in the policy, have been exceeded, the claim is processed by the policy issuer and the user 671 receives the compensation specified in the policy.

FIG. 15 is a network diagram of the weather risk estimation system 50, including the WRE 100. The data collection stations 604 are used to obtain data related to weather phenomena and ground, ocean, atmospheric, and other environmental conditions at various locations including, among other systems, satellite imagery centers that receive data from satellites, surface weather observation stations, lightning detection systems, radar processing stations, seismic activity monitoring stations, global positioning satellites, ocean buoys, and/or any other environmental measurement system understood in the art. Additional data may also be gathered from vehicles or mobile transmitters/receivers, including aircraft 692, ships 694 and ground transportation 696, along with information regarding their locations. Vehicles may transmit, receive, or transmit and receive to and from one of a system of transmitters and receivers 690. The system may also collect some types of data from mobile users 684 using handheld or portable devices 682 via a wireless network 680. Such data may include one or more of weather-related data, imagery, video, audio, or related position information. Data from each source may be produced in different formats, and may be transferred over a variety of public and/or private wired and wireless networks 600 generally known in the art, including the Internet, to one or more weather databases 610 or other databases 612, 614, 616, 618 utilized by the WRE 100. Previously gathered and/or analyzed data may also be present in these databases.

In one embodiment, one or more data sources, including the weather databases 610, the damage database 612, and the other databases 614, 616, 618 provide information over the network 600 to the WRE 100. The WRE 100 may also contain an internal weather database. Such information may be provided in any format or protocol generally known in the art, including an extensible markup language (XML) format.

The weather function 200, damage function, impact functions 400 and other data or information, collectively referred to herein as weather impact estimation data, produced or obtained by the WRE 100 may reside on a PC or server, or distributed servers (not shown). It could use commercial or open source database platforms such as Oracle, Microsoft SQL Server, MySQL, or PostgreSQL. The WRE 100 may provide external communication through database connections, custom interfaces, or a web application server, or any other communications medium or system generally known in the art.

In one embodiment, the WRE 100 provides weather impact estimation data to a subscriber system 670 used by a subscriber 673. Examples of subscribers 673 include commodity traders, financial brokers, insurance and reinsurance companies, television or network broadcasters, government agencies, emergency relief organizations, travel operators, flight providers, real estate developers, construction companies, outdoor venue operators, or any other entity or service interested in obtaining weather impact estimation data. The subscribers 673 may or may not pay a fee for access to or otherwise obtaining the weather impact estimation data from the WRE 100. Subscribers may receive the weather impact estimation data before the same data is made available to non-subscribers of the WRE 100, or alternately subscribers 673 may be provided with complete weather impact estimation date while non-subscribers may access only portions of the weather impact estimation data. In some embodiments, subscribers 673 to the WRE 100 may include providers 120 and/or user 671 as described above. In one embodiment, the data transfers could be accomplished using the transfer of XML data. The weather impact estimation data may be viewed by the subscriber 673 using software and hardware tools 672 to navigate through graphical and/or textual display of the weather impact estimation data and other weather related information supplied by the WRE 100. The information may also be received as an e-mail or instant message indicating qualitative and quantitative information related to the weather impact estimation data provided by the WRE 100. The weather impact estimation data may be provided in a customized format for each subscriber system 670 based on the needs of the subscriber 673.

The information may be displayed graphically showing the differences between the current weather impact estimation data and previous weather impact estimation data (from earlier forecast periods) to aid the subscriber 673 in rapidly assessing any changes in the weather impact estimation data provided by WRE 100.

In an embodiment, weather impact estimation data can be provided to subscribers 673 via voice communication and/or conventional telephone service or devices 675, including facsimile machines 676. Information can also be received by the subscriber 673 on a handheld or portable device 682, such as cell phone, smart phone, or PDA.

Portions or all of the weather impact estimation data may be transferred to an Internet or networked weather damage estimation server 664. The weather damage estimation server 664 may be a simple PC, a web server, a combination of separate web server, application server, and database server, or other arrangement of server resources. The Internet weather damage estimation server 664 could provide weather impact estimation data over the network 600 to other network systems or to user equipment 667, which may include PC's with attached monitors (not shown), displaying Internet browsers or other applications operated by users 671. User equipment 667 also includes portable devices, such as laptop computers, cell phones, smart phones, PDA's, or any other networked communication device understood in the art.

The Internet weather damage estimation Server 664 could serve a web page containing both HTML and JavaScript code. The JavaScript code could periodically, or upon user interaction, obtain additional or more up-to-date weather impact estimation data from the weather damage estimation server 664 without reloading the web page. In one embodiment, the data is in XML form.

In another embodiment, weather impact estimation data from the WRE 100 are also provided to Internet or network users 671. The weather impact estimation data could be presented via a web-based interface through an Internet browser or customer application on the user equipment 667 to allow interactive exploration of the weather impact estimation data. A user 671 could enter the URL of a weather damage estimation server 664. The server could attempt to distinguish the user's location from IP address information, from a previously stored browser cookie, or from user input.

The weather impact estimation data may also be provided by the WRE 100 to a third-party server 674. In one embodiment, the subscriber 673 of the WRE 100 could provide data to third-parties, who would then provide value-added analysis or repackaging of the data.

In one embodiment, weather impact estimation data from the WRE 100 is used by third-parties to provide value-added services. For example, a search engine operator may provide recent news or other information related to an earth event in addition to weather impact estimation data obtained from the WRE 100 in response to related keywords. For instance, an Internet search for "hurricane tampa" could produce a map of current and/or predicted tropical cyclones impacting the Tampa area, along with information related to information about the tropical cyclones obtained from the WRE 100 and other information sources. The graphical results could be provided with regions responsive to further user input, allowing the user to trigger display of additional information about product and services, or damage assessments. The search could be conducted on data transmitted to the search engine provider's database, or via calls to the Internet weather damage estimation server 664 or similar resource provided on the network 600.

Figure 16:
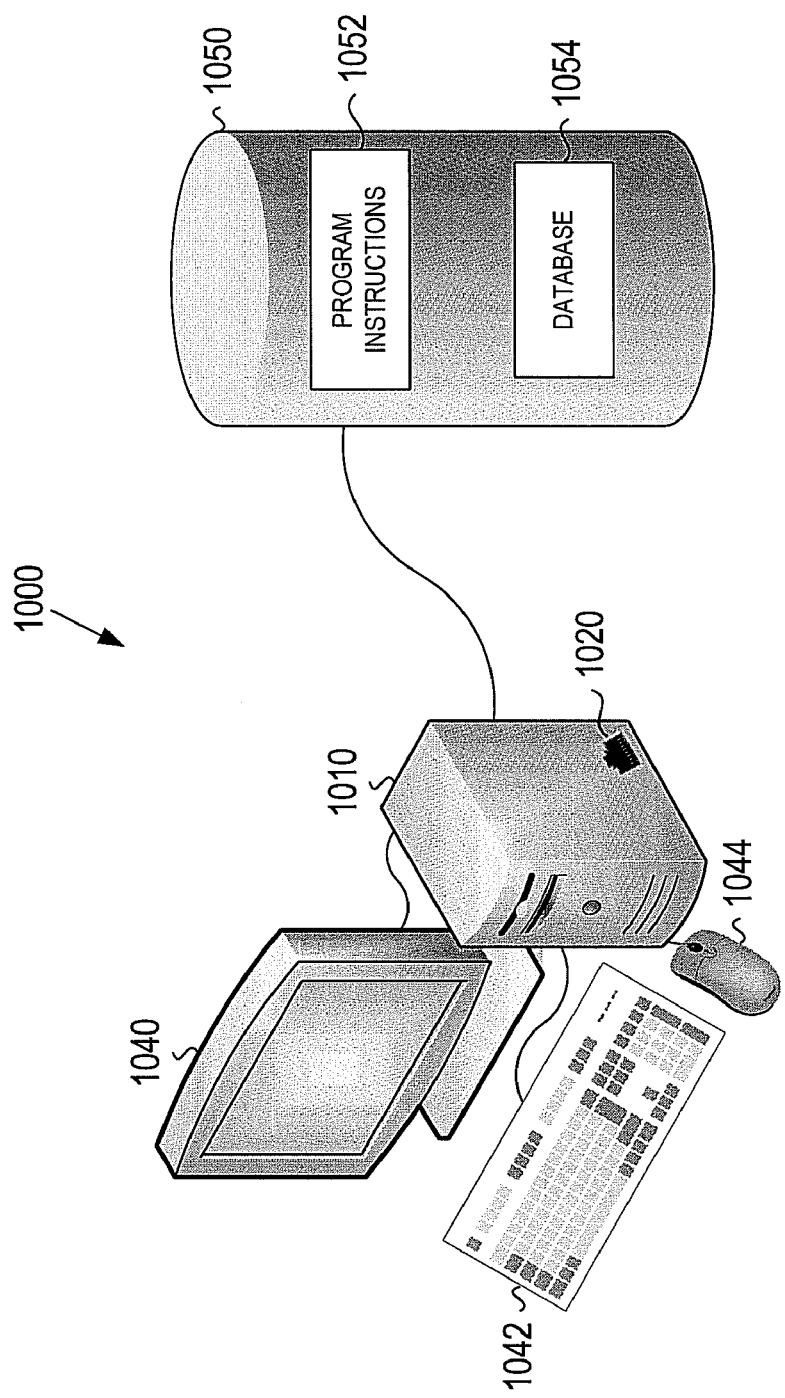
FIG. 16 is a block diagram of a computer system for realization of the weather risk estimator of FIG. 1.

FIG. 16 illustrates a block diagram of a computer system 1000 for realization of a computer-implemented apparatus that may form all or a part of one or more implementation(s) or embodiment(s) of the present disclosure. The computer system 1000 includes a computer 1010, a keyboard 1042, a mouse 1044, and a display device 1040. The computer 1010 has a network port 1020 for connecting to the computer network 600. The computer 1010 is connected to a storage device 1050 which contains program instructions 1052 for the software application(s) that provides the logical functions of the computer-implemented apparatus. The storage device 1050 also contains a database 1054 for storing data.

Those skilled in the art will recognize that the program instructions 1052 for software applications implementing all or a portion of one or more embodiment(s) of the present disclosure may be written in a programming language such as Java or C++, and that the database 1054 may be implemented with a database package such as Microsoft Access™ or a database management system (DBMS) such as Microsoft SQL Server™, Microsoft SQL Server CE™, IBM DB2™, mySQL or postgreSQL.

Figure 17:
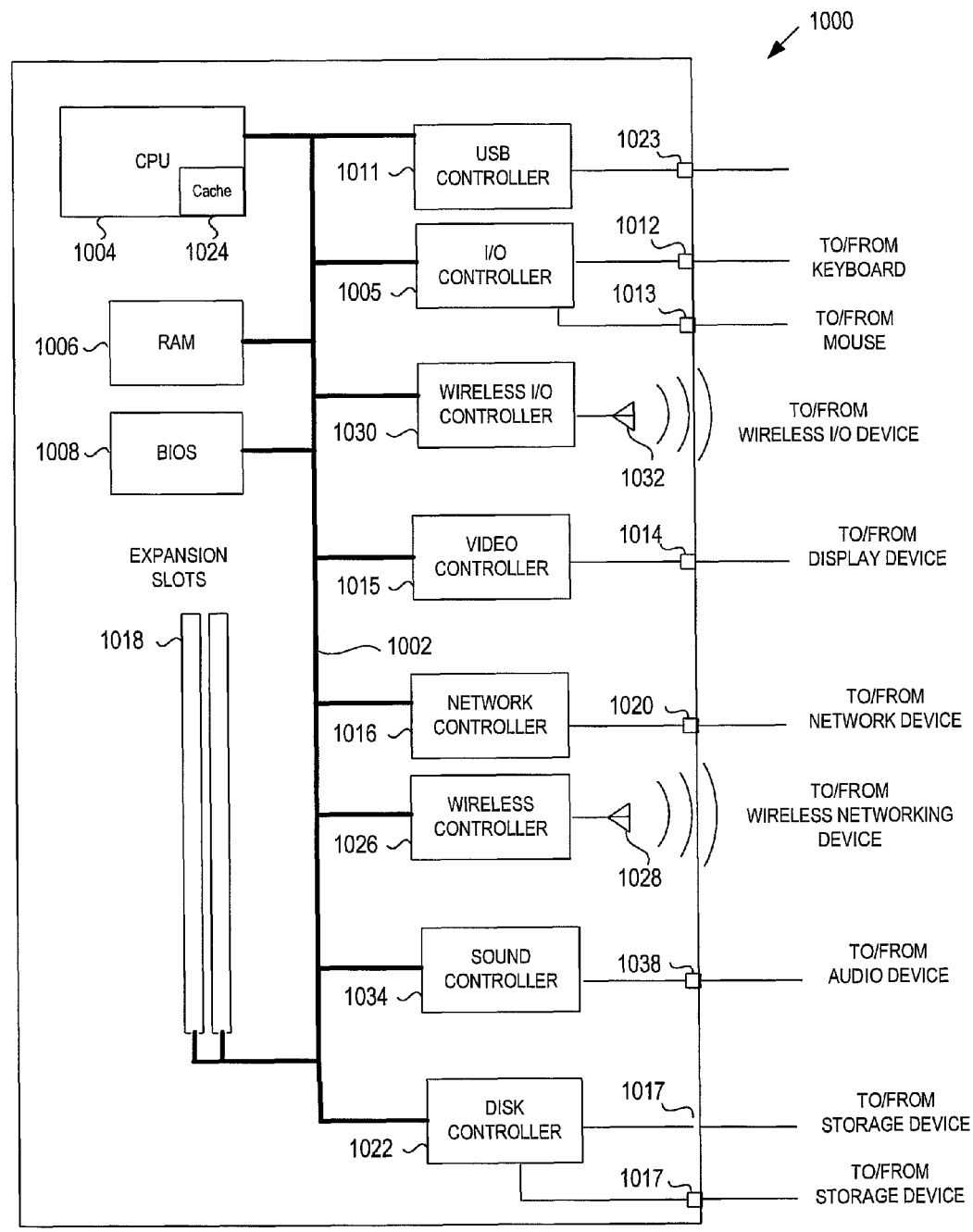
FIG. 17 is a block diagram of a computer system for realization of the weather risk estimator of FIG. 1.

FIG. 17 is a block diagram of a computer system 1000 through which the embodiments of the weather risk estimation system 50, including the weather risk estimator 100 may be implemented. A system bus 1002 transports data amongst the Central Processing Unit (CPU) 1004, RAM 1006, the Basic Input Output System (BIOS) 1008 and other components. The CPU 1004 may include a cache memory component 1024. The computer system 1000 may include one or more external storage ports 1017 for accessing a hard disk drive, optical storage drive (e.g., CD-ROM, DVD-ROM, DVD-RW), flash memory, tape device, or other storage device (not shown). The relevant storage device(s) are connected through the external storage port 1017 which is connected to the system bus 1002 via a disk controller 1022. A keyboard and pointing device (e.g. mouse. touch pad) (not shown) can be connected to the keyboard/mouse port(s) 1012, and other I/O devices could be connected to additional I/O port(s) 1013, which are connected to the system bus 1002 through the I/O controller 1005. Additional ports or devices, such as serial ports, parallel ports, firewire adapters, or biometric devices (not shown), may be utilized through the I/O controller 1005. A display device (not shown) can be connected to a display device port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected to the USB port 1023 which is connected to the system bus 1002 through the USB controller 1011. Other devices, such as cellular phones, PDAs, and other portable devices may also be connected wirelessly via a wireless I/O antenna 1032 that is connected to a wireless I/O controller 1030. Examples of wireless I/O technologies include, but are not limited to, Bluetooth, Infrared (IR), and Radio-Frequency (RF). Audio devices, such as microphones, speakers, or headphones may be connected to a sound port 1038 that is connected to a sound controller 1034 that is connected to the system bus 1002. Expansion slots 1018 can include Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and/or an internal or external battery. Detailed descriptions of these devices have been omitted for convenience only and should not be construed as limiting.

The computer system 1000 described with respect to FIGS. 16 and 17 can be part of the WRE 100, or can be a processor, server or similar apparatus present in another element of the weather risk estimation system 50 or connected thereto via the network 600.

The network 600 is used to facilitate communication between the various devices, modules and components of the weather risk estimation system 50. The network 600 may be any network or system generally known in the art, including the Internet, an intranet, a local area network (LAN), a wide area network (WAN), a metropolitan area network (MAN), a direct connection or series of connections, a cable television infrastructure, a cellular telephone network or any other network, transmission channel or medium capable of facilitating communication between the devices, modules and other components of the weather risk estimation system 50. The network may be wired, wireless or a combination thereof. Wired connections may be implemented using Ethernet, Universal Serial Bus (USB), RJ-11 or any other wired connection generally known in the art. Wireless connections may be implemented using wifi, wimax, bluetooth, infrared, cellular networks, satellite or any other wireless connection methodology generally known in the art. The network maybe implemented in a client-server, token-ring, peer-to-peer manner or any other network topology known in the art. Additionally, several networks may work alone or in communication with each other to facilitate communication in the network 600. Various networking standards may be employed for allowing user equipment 667 to communicate with the network 600, such as EDGE, 3G and/or 802.11.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for instance, computer readable program code means for providing and facilitating the mechanisms of the embodiments of the present disclosure. The article of manufacture can be included as part of a computer system or sold separately.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

We claim:

1. A computer-implemented method of presenting a visual representation of a predicted impact of a weather phenomenon to a location, the method comprising:
   obtaining, by a computer, a damage function for a value of a characteristic of the weather phenomenon;
   determining, by the computer, a probability of occurrence associated with the value based on a weather function;
   obtaining, by the computer, an impact function by scaling the damage function according to the probability of occurrence;
   obtaining, by the computer, a photographic image depicting at least one structure at the location;
   modifying, by the computer, the photographic image to reflect probable damage to the at least one structure commensurate with the impact function; and
   providing, by the computer, an interactive visual representation of the predicted impact of the weather phenomenon to the location, the visual representation including the modified photographic image.

2. The method of claim 1, wherein the predicted impact is the most likely impact on the at least one structure based on an analysis of the impact function.

3. The method of claim 1, further comprising:
   providing an offer for a product or service related to the predicted impact of the weather phenomenon, wherein the pricing for the product or service is determined in response to an uncertainty in the predicted impact determined using the impact function.

4. The method of claim 1, wherein the photographic image is obtained from one or more publicly accessible databases.

5. The method of claim 1, wherein the predicted impact includes at least one of structural damage, flood level, economic loss, and accessibility to the location.

6. The method of claim 1, wherein the interactive visual representation includes a three dimensional representation of flood levels in relation to the at least one structure.

7. The method of claim 1, further comprising:
   providing a slider on the interactive visual representation, the slider being operable to alter the values of one or more characteristics of the weather phenomenon;
   obtaining a modified impact function result based on the alteration of the values using the slider; and
   updating the interactive visual representation using the modified impact function result.

8. The method of claim 7, wherein the interactive visual representation is updated in substantially real time responsive to the operation of the slider.

9. A computer-implemented method of determining a predicted impact to a location, the method comprising:
   (a) obtaining, by a computer, at least one impact function related to a change in an environmental condition, wherein the impact function comprises a damage function for the environmental condition scaled according to a probability of occurrence;
   (b) predicting, by the computer, the impact to the location in response to the change in the environmental condition using the at least one impact function; and
   (c) providing, by the computer, an interactive visual representation of the predicted impact to the location, wherein the interactive visual representation comprises a photographic image of the location modified to depict probable damage to the at least one structure commensurate with the predicted impact.

10. The method of claim 9, wherein the predicted impact is the most likely impact related to the change in the environmental condition at the location based on an analysis of the impact function.

11. The method of claim 9, wherein the change in the environmental condition includes climate change attributed to both human influence and natural fluctuations.

12. The method of claim 11, wherein climate changes include at least one of a rise in the average global temperature, a rise in the average sea-level, an accelerated melting of polar ice, an accelerated melting of glaciers, and deforestation.

13. The method of claim 9, further comprising:
   (d) providing an offer for a product or service related to the predicted impact of the change in the environmental condition, wherein the pricing for the product or service is determined in response to an uncertainty in the predicted impact determined using the impact function.

14. The method of claim 9, wherein the photographic image is obtained from one or more publicly accessible databases.

15. The method of claim 9, wherein the predicted impact to the at least one structure at the location includes at least one of structural damage, change in water level, economic loss, property loss, and roadway accessibility to the location.

16. The method of claim 9, further comprising:
(d) providing a slider on the interactive visual representation, the slider being operable to alter the values of the change in the environmental condition;
(e) obtaining a modified impact function result based on the alteration of the values using the slider; and
(f) updating the interactive visual representation using the modified impact function result.

17. The method of claim 16, wherein the interactive visual representation is updated in substantially real time responsive to the operation of the slider.

18. An article of manufacture for presenting a visual representation of a probable impact of a weather phenomenon to a location, the article of manufacture comprising a non-transitory machine-readable medium holding machine-executable instructions for performing a method comprising:
obtaining, by a computer, a damage function for a value of a characteristic of the weather phenomenon;
determining, by the computer a probability of occurrence associated with the value based on a weather function;
obtaining, by the computer, an impact function by scaling the damage function according to the probability of occurrence;
obtaining a photographic image of at least one structure at the location; and
providing an interactive visual representation of a probable impact of the weather phenomenon on the at least one structure by modifying the photographic image to depict damage to the at least one structure based on a predicted impact to the at least one structure determined using the impact function.

19. The article of manufacture of claim 18, wherein the predicted impact is the most likely impact on the at least one structure at the location based on an analysis of the impact function.

20. The article of manufacture of claim 18, further comprising:
providing an offer for a product or service related to the predicted impact of the weather phenomenon as depicted by the interactive visual representation, wherein the pricing for the product or service is determined in response to an uncertainty in the predicted impact determined using the impact function.

21. The article of manufacture of claim 18, wherein the photographic image is obtained from one or more publicly accessible databases.

22. The article of manufacture of claim 18, wherein the predicted impact includes at least one of structural damage, flood level, economic loss, and accessibility to the location.

23. The article of manufacture of claim 18, wherein the interactive visual representation includes a three dimensional representation of flood levels in relation to the at least one structure.

24. The article of manufacture of claim 18, further comprising:
providing a slider on the interactive visual representation, the slider being operable to alter the values of one or more characteristics of the weather phenomenon;
obtaining a modified impact function result based on the alteration of the values using the slider; and
updating the interactive visual representation using the modified impact function result.

25. The article of manufacture of claim 24, wherein the interactive visual representation is updated in substantially real time responsive to the operation of the slider.

26. A system for presenting a visual representation of a probable impact of a weather phenomenon to a location, the system comprising:
a network device configured to
obtain a damage function for a value of a characteristic of the weather phenomenon, and
obtain a photographic image of at least one structure at the location; and
a processor configured to
determine a probability of occurrence associated with the value based on a weather function;
determine an impact function for the location by scaling the damage function according to the probability of occurrence,
modify the photographic image to reflect probable damage to the at least one structure commensurate with the impact function, and
provide an interactive visual representation of the predicted impact of the weather phenomenon to the location, the visual representation including the modified photographic image.

27. The system of claim 26, further comprising;
a memory configured to store the photographic image, the weather function, the damage function, and the impact function.

* * * * *